United States Patent [19]

Akasaka et al.

[11] Patent Number: 4,989,166

[45] Date of Patent: Jan. 29, 1991

[54] METHOD FOR SYNTHESIZING ANALYSIS MODEL AND FLOW ANALYSIS SYSTEM

[75] Inventors: Shingo Akasaka, Zushi; Kazuhiro Sugino; Junichi Saeki, both of Yokohama; Kunihiko Nishi, Tokyo; Hisashi Onari, Yokohama, all of Japan

[73] Assignee: Hitachi, Ltd., Tokyo, Japan

[21] Appl. No.: 340,480

[22] Filed: Apr. 19, 1989

[30] Foreign Application Priority Data

Jul. 12, 1988 [JP] Japan .................. 63-171778
Aug. 1, 1988 [JP] Japan .................. 63-190645

[51] Int. Cl.⁵ ........................... G06F 15/46
[52] U.S. Cl. ........................ 364/578; 364/476
[58] Field of Search .......... 364/578, 506, 505, 509, 364/488, 489, 521, 476, 510

[56] References Cited

U.S. PATENT DOCUMENTS

| | | | |
|---|---|---|---|
| 4,534,003 | 8/1985 | Manzione | 364/578 |
| 4,740,886 | 4/1988 | Tanifuji et al. | 364/150 |
| 4,809,202 | 2/1989 | Wolfram | 364/578 |
| 4,823,274 | 4/1989 | Kiya et al. | 364/188 |

Primary Examiner—Thomas G. Black
Assistant Examiner—Michael Zanelli
Attorney, Agent, or Firm—Antonelli, Terry, Stout & Kraus

[57] ABSTRACT

The present invention is applied to the design of a mold for a semiconductor or the like and provides a method for synthesizing analysis models, in which analysis programs corresponding to shapes and features of an object to be analyzed are registered in advance in a numerical analysis system, the analysis programs are made to correspond to partial shapes divided according to the shapes and features of the object to be analyzed and are partially modelled, whereas input and output items between adjacent portions are controlled on the basis of the positional relationship between the portions and input and output information of the analysis programs placed in correspondence to the portions. The invention further provides a flow analysis system for computing a flow state of material to evaluate a shape of a flowpassage, a flow control condition, material and the like, the system comprising input means for inputting a flowpassage shape of a mold, properties of material and flow control conditions, model synthesizing means for extracting a feature of the flowpassage shape, judging an adaptability with the already registered analysis model from the extracted features and synthesizing flow analysis models capable of analyzing the entire flowpassage, and program execution means for removing programs corresponding to the synthesized model to sequentially execute them.

12 Claims, 18 Drawing Sheets

FIG. 7

(a) SHAPE FEATURE REGISTRATION UNIT                                241

| NAME OF FEATURE | CALCULATION FORMULA | CALCULATED VALUE |
|---|---|---|
| $T_1$ | $f_1$ (PARAMETER FOR DETAILS OF SHAPE) | |
| $T_2$ | $f_2$ (PARAMETER FOR DETAILS OF SHAPE) | |
| ⋮ | ⋮ | |
| $T_n$ | $f_n$ (PARAMETER FOR DETAILS OF SHAPE) | |

(b) SHAPE DIVISION RULE REGISTRATION UNIT                         243

| IF UNIT | THEN UNIT |
|---|---|
| $T_1 > \alpha$ AND $T_2 \leq \beta$ | DIVIDE OBJECT INTO $A_1$ AND $A_2$ (DIVISION RULE) |
| ⋮ | ⋮ |
| $T_n \geq \gamma$ OR $T_m = \gamma'$ | DIVIDE OBJECT INTO $A_1$, $A_2$ AND $A_3$ (DIVISION RULE) |

(c) SHAPE FEATURE JUDGING RULE REGISTRATION UNIT                  242

| IF UNIT | THEN UNIT |
|---|---|
| $T_1 > \alpha'$ AND $T_3 \leq \alpha''$ | SHAPE FEATURE $S_1$ |
| $T_n < \alpha''$ AND $T_{n-1} > \beta'$ | SHAPE FEATURE $S_2$ |

(d) PARTIAL SHAPE REGISTRAION UNIT                                245

| NAME OF PART | SHAPE | FEATURE OF SHAPE | NAME OF PROGRAM TO ANALYZE | NAME OF PROGRAM TO MODEL | NAME OF PARTIAL MODEL |
|---|---|---|---|---|---|
| $A_1$ | a' b' c' | $S_1$ $S_3$ | $P_1$ | $M_1$ | $MOD_1$ |
| $A_2$ | a'' b'' c'' | $S_2$ | $P_2$ | $M_2$ | $MOD_2$ |

(e) DIVIDED PORTION POSITION REGISTRATION UNIT                    244

| NAME OF PART | NUMBER OF ADJACENT PARTS | NAME OF ADJACENT PARTS |
|---|---|---|
| $A_1$ | 1 | $A_2$ |
| $A_2$ | 2 | $A_3$ $A_4$ |
| $A_3$ | 1 | |

(f) ANALYSIS PROGRAM REGISTRATION UNIT                            25

| NAME OF PROGRAM | ITEM | INPUT/OUTPUT ITEM | MODELLING PROCEDURE | FEATURE OF ADAPTABLE SHAPE |
|---|---|---|---|---|
| $P_1$ | $\alpha$ | $IN_1/OUT_1$ | $M_1$ | $S_1$ $S_3$ |
| $P_2$ | $\alpha$ | $IN_2/OUT_2$ | $M_2$ | $S_2$ |
| $P_3$ | $\beta$ | ----- | $M_3$ | $S_n$ |
| ⋮ | | | | |
| $M_1$ | PREPARATION OF MODEL | a' b' c' | | |
| $M_2$ | PREPARATION OF MODEL | a'' b'' c'' | | |
| ⋮ | | | | |
| $H_1$ | CONVERSION | $OUT_1/IN_2$ | | |
| $H_2$ | CONVERSION | | | |

FIG. 9
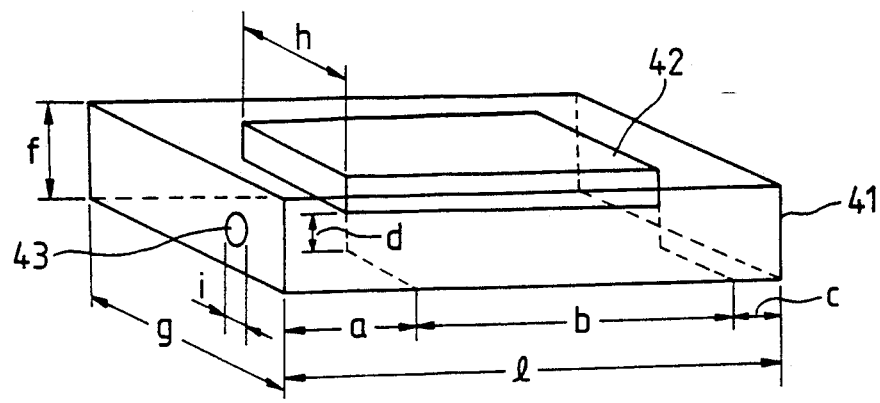
FIG. 10
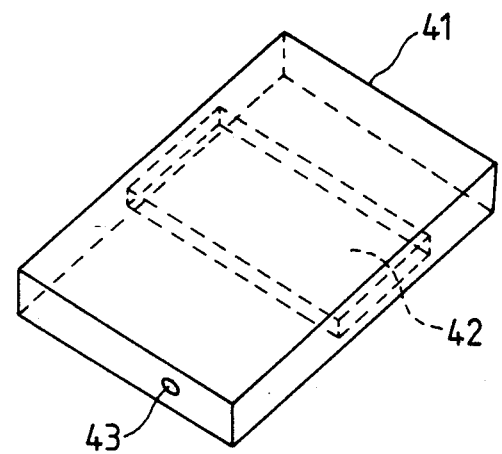
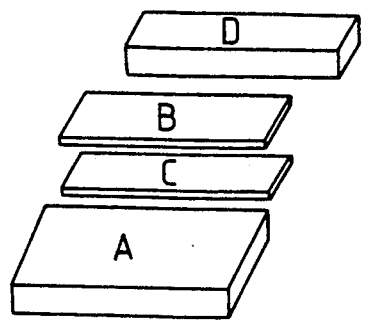

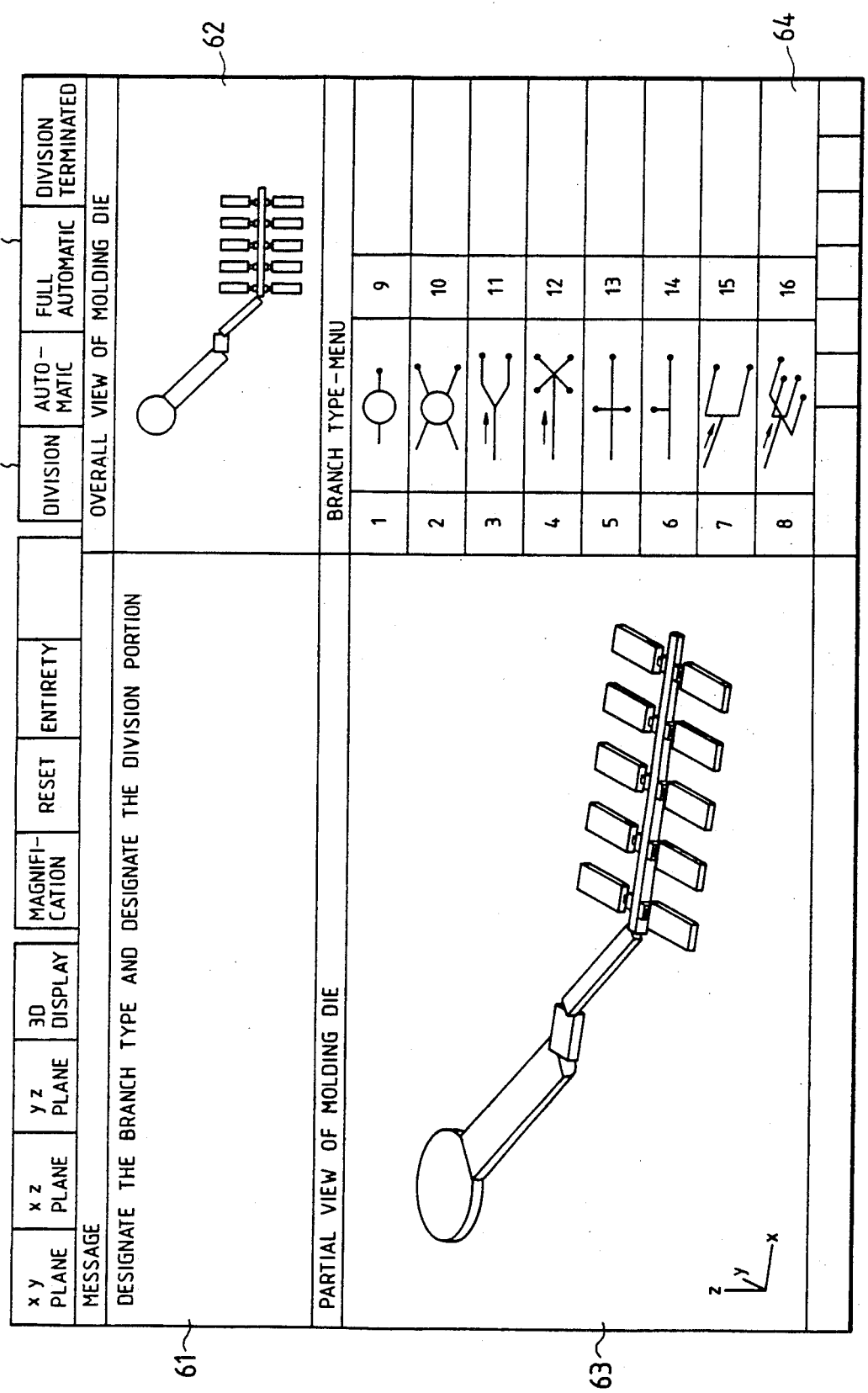

METHOD FOR SYNTHESIZING ANALYSIS MODEL AND FLOW ANALYSIS SYSTEM

BACKGROUND OF THE INVENTION

1. Field of the Invention

The present invention relates to a method for synthesizing an analysis model automatically according to a shape or the like of an object to be analyzed, and a flow analysis system which evaluates and designs a flowpassage of a mold, a resin characteristic and a molding condition from a flow state of resin.

2. Description of the Prior Art

In numerical analysis for the design of products, generally, a shape of an object to be designed is mathematically modelled. According to the latest CAE system, modelling (mesh automatic division when a finite element method is used) of a shape-defined product is automatically carried out, for example, as shown in "Mold Technique - Data Book For Mold For Plastic Injection Molding" (Vol. 2, No. 11, Oct. 20, 1987, issued by Nikkan Kogyo Shimbunsha), Chapter 2 (Runner and Gate), pages 16 to 19.

Further, in a conventional system, in designing a mold for housings such as used for electric appliances for home-use, a fluidity of a thermoplastic resin as a material is evaluated. In designing, the matter of importance is an external shape of a product, which is related to the design thereof.

The above-described prior art has paid no attention to the following points and could not be applied to the design of a molding die for semiconductors.

(1) Conventional model generation methods are peculiar to analysis program using analysis procedures, such as a finite element method and a difference calculus, and therefore, no consideration has been given to the situation in which plurality of analysis programs are combined to form an analysis model. An analysis model is not formed by combining a plurality of analysis programs in a manner such that one part of an object to be analyzed is worked out by a difference calculus while the other is worked out by a finite element method, or one part is worked out by an analysis program (1) according to the difference calculus while the other worked out by an analysis program (2) according to the difference method, but preparation of a model is exclusively carried out by an analyst. Therefore, the prepared analysis model is characterized by individual difference results depending on the experience of the analyst in preparing models or on the difference in knowledge about the analysis program. It generally takes much time to prepare a model.

(2) Semiconductor plastic packages are made of thermoset resin instead of thermoplastic resin used for housings, such as for electric appliances for home-use. The thermoset resin is a material which absorbs heat from a mold during molding to induce hardening reaction whereby viscosity is changed in a complicated way. It is therefore necessary to make an accurate estimate of change in viscosity of resin during molding.

A cavity portion of a mold for a semiconductor includes therein internal elements such as a lead frame, chips, Au wires, etc. which constitute a semiconductor, which may possibly be greatly deformed due to the flow of resin during molding. The quality of semiconductor products is directly affected by the deformation of these internal elements. Accordingly, it is necessary to evaluate not only the filling state of the resin, but also the influence thereof on the internal elements. However, when the internal elements are placed in a flowpassage of the mold which is in the form of a flattened and narrow configuration, not only the internal elements are deformed, due to the flow of the resin, but the state of flow of the resin is greatly changed. It is difficult to develop a program for analyzing (simulation) the change which occurs. The reason is that in order to model the state of flow of the resin resulting from the internal elements to reflect on the program, improvements have to be made while adjusting to a number of experimental data, for which long periods and many steps are required, as mentioned in the aforementioned paragraph (1). Actually, it is impossible to repeat such a trial-and-error program development for every product.

(3) As mentioned in the above-described paragraph (2), in order to analyze the deformation of the internal elements in the mold and the like, it is necessary to perform a stress analysis and the like from not only the flow state of the resin, but also from the viscosity, flow velocity, pressure and the like obtained from the flow state. However, an analysis program is prepared so that data required by the analysis to be carried out by said program is input in a specific form, and the output data is output in the form suitable for expressing the result. Therefore, in the case where a plurality of analysis programs are used to perform analysis, it is necessary to convert input and output data. To this end, considerable knowledge of the function of programs and input and output is required as mentioned in the above-described paragraph (1), and it is difficult to perform such analysis.

SUMMARY OF THE INVENTION

An object of the present invention is to provide a method for synthesizing an analysis model which can be formed in a combination of different analysis programs with less preparation time.

A further object of the present invention is to provide a flow analysis system which can perform analysis and evaluation while adjusting to the shape of a flowpassage, flow control conditions, materials. etc.

Another object of the present invention is to provide a flow analysis system which can flexibly cope with the change of the shape of the flowpassage, flow control conditions, materials, etc. corresponding to the change of the proposed design.

Still another object of the present invention is to provide a flow analysis system which can perform a flow analysis of materials which change in characteristic according to hysteresis.

Another object of the present invention is to provide an apparatus which can start the flow analysis system described above, and an apparatus which can make a high-speed and accurate numerical computation of the aforesaid flow analysis system on the host side while providing interactive processing thereof on the work station side.

Another object of the present invention is to provide a system which makes use of the aforesaid flow data system to combine and analyze analysis related to the flow analysis.

For achieving the above-described objects, the present invention provides a method for analyzing models, which comprises registering in advance analysis programs corresponding to various shapes and features of an object to be analyzed in a numerical analysis system, causing the analysis programs to correspond to partial shapes divided according to the shapes and features in the object to be analyzed to partially model them, and controlling input and output items between adjacent portions on the basis of the positional relationship between parts and the input and output informations of the analysis programs corresponding to the parts.

The present invention further provides a flow analysis system which calculates the flow state of material to evaluate the shape of a flowpassage, flow control conditions, materials, etc., the system comprising input means for inputting the shape of a flowpassage of a mold, properties of material and flow control conditions, model synthesizing means for extracting features of the flowpassage shape, judging an adaptability with respect to the already registered analysis model from the extracted feature and synthesizing flow analysis models which can analyze the entire flowpassage, and program execution means for taking out programs corresponding to the synthesized models from an analysis library to sequentially execute them.

Moreover, the present invention further provides model reconstruction means for partially resynthesizing already synthesized flow analysis models relative to a partial change of input data such as the shape of a flowpassage, flow control conditions, material, etc.

Furthermore, the present invention includes experimental data registration means, characteristic formula defining means for material characteristic formula, difference evaluation formula defining means for defining an evaluation formula used to numerically-evaluate the difference between the experimental data and the material characteristic formula, difference evaluation means which uses said evaluation formula to compute the difference between the experimental data and the material characteristic formula, and parameter correction amount computation means which constitutes the material characteristic formula and in which the correction amount of a parameter peculiar to the material determined from the experimental data is computed from the difference computed by said difference evaluation means, which means constitute material characteristic formula parameter presuming means.

The present invention further includes analysis result registration means for registrating analysis results, and result display means for displaying a previous analysis result registered in said analysis result registration means and present analysis result so that both the results can be simultaneously and easily compared.

The present invention further includes know-how registration means for registrating the relationship between the feature of shape which is a know-how item for constructing a flow analysis model and an analysis model, means for registrating a group of programs capable of executing an analysis model on a computer, that is, programs for registering analysis libraries. The present invention further includes model interaction synthesizing means for dividing the shape by interaction processing, defining the amount of a feature in an interactive manner and allocating an analysis model to a partial shape, log retaining means for retaining input information during interactive processing, know-how forming means for registering know-how in the know-how registration means from log information to form a know-how effective for synthesizing models, and know-how editing means for merging know-how already registered in the know-how registration means and know-how formed by the know-how forming means and avoiding an occurrence of contradiction between the different know-how.

Furthermore, for achieving the aforesaid objects, the present invention provides a work station comprising a bus serving as a signal transmission path between devices connected so as to start a flow analysis system, a bus control device for controlling said bus, a central processing unit connected to said bus, a main memory connected to a disk control device and said central processing unit, a display device, a keyboard, and a disk connected to said disk device.

The present invention further includes, in said work station in which the flow analysis system can be started, a communication control device which is connected to a bus to transmit data fed from the bus to other devices and receive data from the other devices, a bus control device for controlling the bus, said bus control device effecting communication with said work station through a MODEM, a central processing unit connected to said bus, a disk control device, a communication control device, a main memory connected to said central processing device, and a work station host computer device connected to a host computer comprising a disk connected to said disk device.

Moreover, for achieving the aforesaid objects, the present invention further provides a flow analysis system, in which the relationship between an analysis model capable of performing a higher degree of analysis and the output result is registered in know-how registration means, and the programmed analysis model is registered in program registration means whereby analysis related to flow analysis can be combined.

BRIEF DESCRIPTION OF THE DRAWINGS

FIGS. 7(a) to 7(f) are respective views showing the table contents of the registration units shown in FIG. 4;

FIGS. 8, 9 and 10 illustrate the process of forming an analysis model in the case where a semiconductor plastic package is taken as an example;

FIGS. 13(a) to 13(h) show an image plane transition of a flow analysis system provided with an analysis model synthesizing method according to the present invention.

DESCRIPTION OF THE PREFERRED EMBODIMENTS

The present invention will be described hereinafter with reference to FIGS. 1 to 13.

Figure 3:
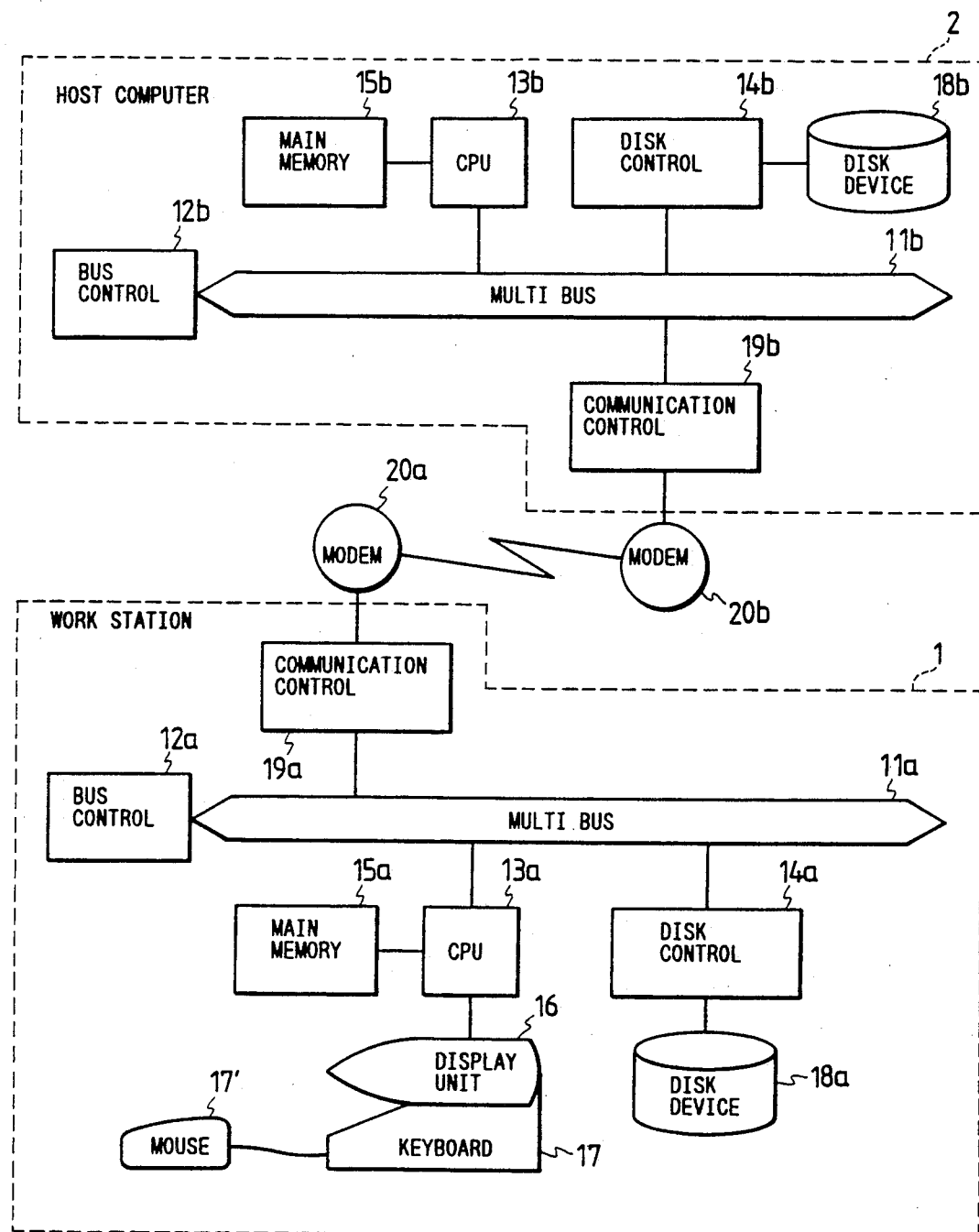
FIG. 3 and FIGS. 4(a) to 4(d) are views showing the hardware structure and the software structure, respectively, as one example of the flow analysis system.

First, a flow analysis system and apparatus according to the present invention will be described. FIGS. 3 and 4 illustrate the structure in hardware and the structure in software, respectively. As shown in FIG. 3, the structure in hardware comprises a work station 1 and a host computer 2, the work station 1 and the host computer 2 being connected by MODEMs 20a and 20b. The work station 1 is designed so that a multi bus 11a placed under control of a bus control device 12a is connected to a central processing unit 13a, a disk device 18a through a disk control device 14a and a MODEM 20a through a communication control device 19a, and the central processing unit 13a is connected to a main memory 15a, a display device 16 and a keyboard 17. The host computer 2 is designed so that a multi bus 11b placed under control of a bus control device 12b is connected to a central processing unit 13b, a disk device 18b through a disk control device 14b and a MODEM 20b through a communication control device 19b, and the central processing unit 13b is connected to a main memory 15b. With this arrangement, data from the keyboard 17 on the side of the work station 1 is stored in the main memory 15a through the central processing unit 13a and at the same time displayed on the display device 16. The data on the main memory 15a is stored in the disk device 18a through the central processing unit 13a, the multi bus 11a and the disk control device 14a. Data is suitably transferred to the computer 2 through the communication control device 19a and the MODEM 20a, and data from the host computer 2 is received over this path as well. Data from the communication control device 19b through the MODEM 20b on the side of the host computer 2 is stored in the main memory 15b through the central processing unit 13b. Data in the main memory 15b is stored in the disk device 18b through the central processing unit 13b, multi bus 11b and disk control device 14b.

Figure 4A:
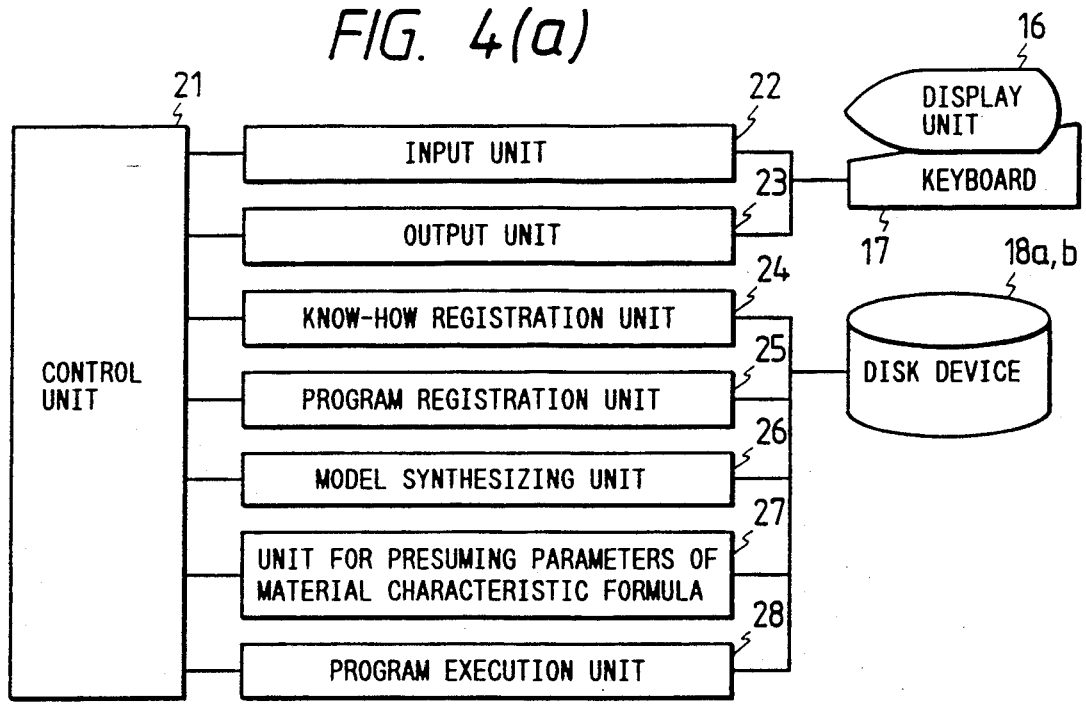
Figure 4B:
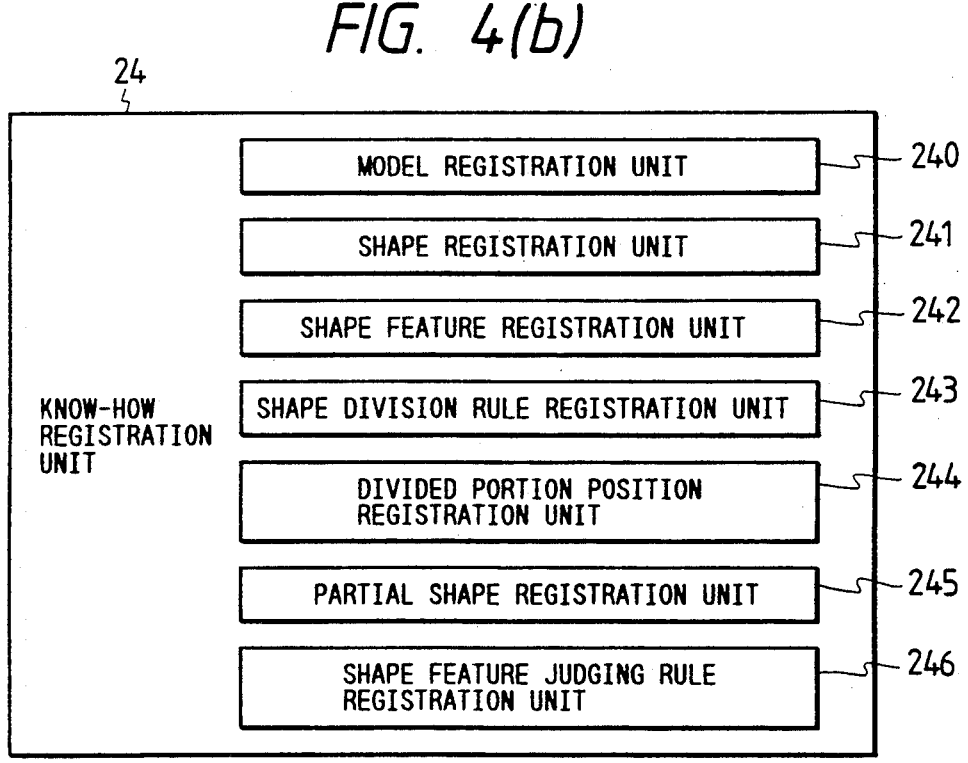
Figure 4C:
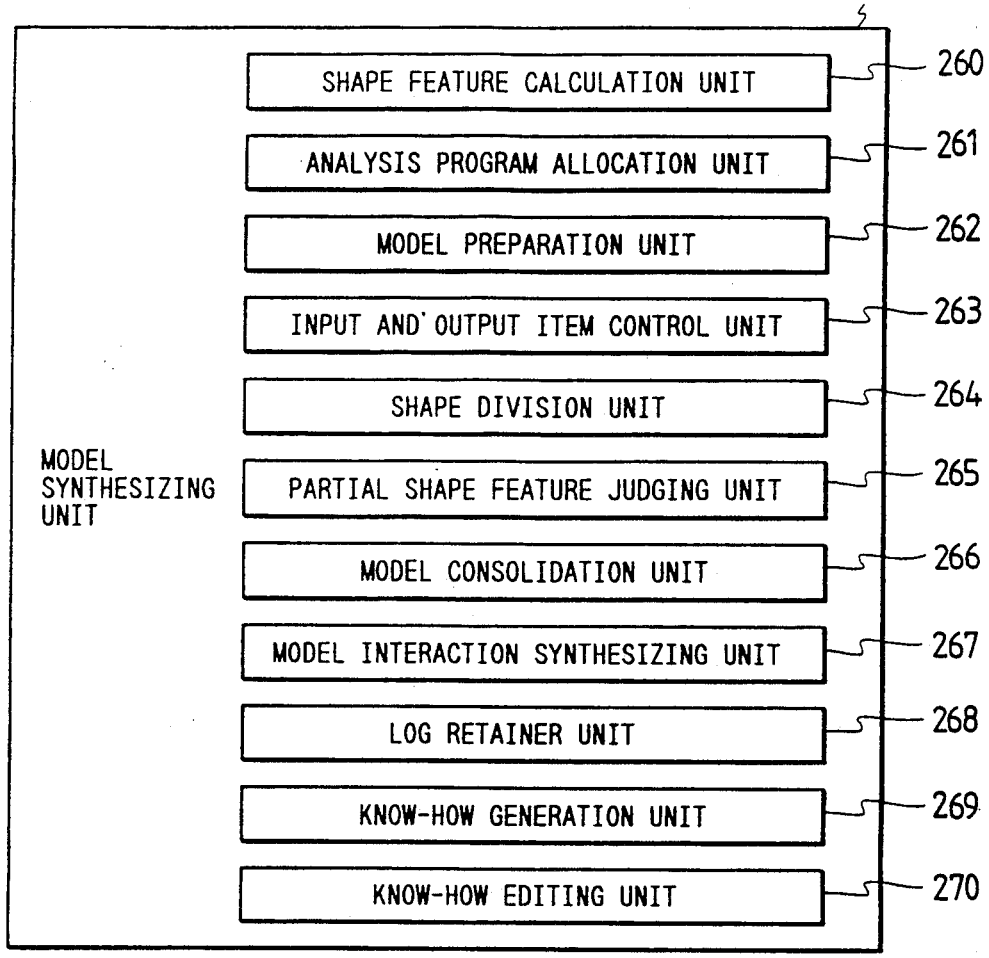
Figure 4D:
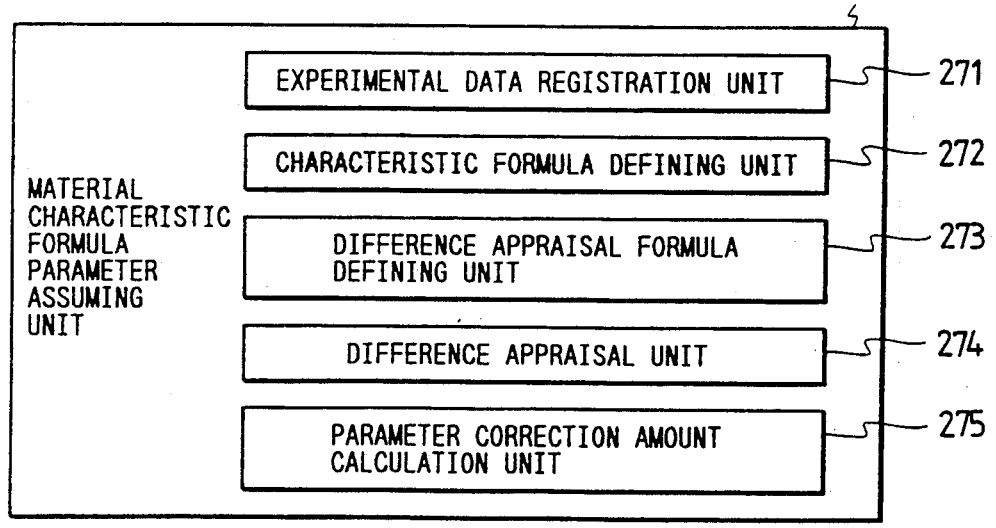

The software structure, as shown in FIG. 4(a), comprises a control unit 21, an input unit 22, an output unit 23, a know-how registration unit 24, a program registration unit 25, a model synthesizing unit 26, a material characteristic formula parameter presuming unit 27, and a program execution unit 28. The know-how registration unit 24 comprises, as shown in FIG. 4(b), a model registration unit 240, a shape registration unit 241, a shape feature registration unit 242, a shape division rule registration unit 243, a divided portion position registration unit 244, a partial shape registration unit 245, and a shape feature judgement rule registration unit 246. The model synthesizing unit 26 comprises, as shown in FIG. 4(c), a shape feature calculation unit 260, an analysis program allocation unit 261, a model preparation unit 262, an input and output item control unit 263, a shape division unit 264, a partial shape feature judging unit 265, an analysis model consolidation unit 266, a model interaction synthesizing unit 267, a log retainer unit 268, a know-how generation unit 269, and a know-how editing unit 270. The material characteristic formula parameter presuming unit 27 comprises, as shown in FIG. 4(d), an experimental data registration unit 271, a characteristic formula defining unit 272, a difference appraisal formula defining unit 273, a difference appraisal unit 274, and a parameter correction amount calculation unit 275.

FIGS. 7(a) to 7(f) show the contents of essential registration units shown in FIGS. 4(a) to 4(d).

That is, by a skilled model analyst are registered in advance analysis programs $P_1$, $P_2$ and $P_3$ and modelling programs $M_1$ and $M_2$ and data conversion programs $H_1$ and $H_2$ into the program registration unit 25 (see FIG. 7(f)), shape features $T_l$ to $T_m$ and calculation formula thereof (an operation formula of which input data are details of a shape of an object to be analyzed) into the shape feature registration unit 241 (see FIG. 7(a)) of the know-how registration unit 24, the division rule with respect to the shape feature into the shape division rule registration unit 243 (see FIG. 7(b)), and the shape feature presuming rule as factor for determining an analysis program into the shape feature judging rule registration unit 242 (see FIG. 7(c)), respectively.

Assume now that the shape of an object a to be analyzed and an item $\alpha$ to analyze are designated from the keyboard 17 by an operator, the shape of the object A to be analyzed is first registered as a shape dimensional value into the shape registration unit 241 of the know-how registration unit 24. In the shape feature calculation unit 260 of the model synthesizing unit 26, the feature values are calculated in accordance with the calculation formulae corresponding to the shape features $T_l$ to $T_n$ shown in the shape feature registration unit 242 of the know-how registration unit 24, and these feature values are registered in the shape feature registration unit 242. Next, they are registered in the form of IF - THEN in the shape division rule registration unit 243. Two part names, a part $A_1$ defined from shapes a', b' and c', and a part $A_2$ defined from a", b" and c", are registered in the partial shape registration unit 245 in accordance with the division rule indicative of how the shape of an object to be analyzed is divided into units capable of being analyzed. At that time, whether or not the surface in contact with the parts $A_1$ and $A_2$ is present is judged, and if the contacted surface is present, the positional relationship between the parts $A_1$ and $A_2$, that is, information of the contacted surface is registered in the divided portion position registration unit 244. Thereafter, the shape feature serving as a specific reference for the analysis program is calculated in the partial shape feature judging unit 265 of the model synthesizing unit 26 on the basis of the rule registered in the shape feature judging rule registration unit 246 with respect to the respective parts $A_1$ and $A_2$, and features $S_1$ and $S_3$ for the part $A_1$ and feature $S_2$ for the part $A_2$ are registered in a shape feature column in the partial shape registration unit 245. Thereafter, using an analysis item $\alpha$ input from the keyboard 17 and the features $S_1$, $S_3$ and $S_2$ for the parts $A_1$ and $A_2$ as search reference values, analysis program names adapted to the parts $A_1$ and $A_2$, respectively, are searched from the program registration unit 25. As a result, program $P_1$ and program $P_2$ are allocated in the part $A_1$ and part $A_2$, respectively, and registered in an adaptable program column in the partial shape registration unit 245. At that time, the analysis programs $P_1$ and $P_2$ have their own modelling procedures $M_1$ and $M_2$, respectively, which are also registered in the program registration unit 25, and therefore, these modelling procedure programs are registered in accordance with the partial shape registration unit 245. With this, in the model preparation unit 262 of the model synthesizing unit 26, the program $M_1$ is executed with respect to the part $A_1$ and a partial model is prepared and similarly, a partial model is prepared with respect to the part $A_2$.

As described above, the analysis programs and models thereof are determined with respect to the respective divided portions, and thereafter, if the data input and output items are consolidated between the models, the entire modelling is completed. In order to consolidate, the divided portion position registration unit 244 is referred so as to check whether or not the parts $A_1$ and $A_2$ are in an adjacent state. In the case where the parts $A_1$ and $A_2$ are assured to be adjacent to each other, a program is searched in which the output item OUT 1 of the program $P_1$ is converted into the input item IN 2 of the program $P_2$ from the input and output items of the programs $P_1$ and $P_2$ by the input and output item control unit 263, and as a result, conversion program $H_1$ is found. Therefore, the procedure for executing the program $H_1$ is determined during the analysis of the parts $A_1$ and $A_2$.

An analysis model comprising a combination of different analysis programs is formed in the above-described procedure.

The synthesizing of analysis models according to the present invention has been schematically described. Next, a mathematical model of an analysis program will be described.

Figure 5:
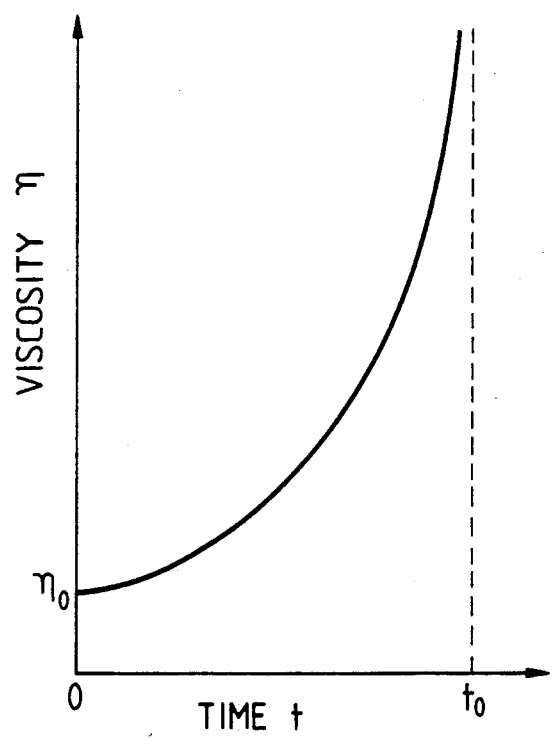
FIGS. 5 and 6 are respective graphs showing the viscosity characteristic of thermoset resin.

An analysis program registered in the program registration unit 25 (see FIG. 7(f)) shown in FIG. 4(a) will be described with reference to FIGS. 5 and 6.

First, the fundamental matter of a model reflected in the analysis program will be described. The flow analysis system to which the present invention is applied is, for example, a mold for a semiconductor plastic package. It is necessary to handle a thermoset resin which is a package material.

Isothermal viscocity formula for thermoset resin are expressed as follows:

$$\eta(t, T) = \eta_o(T) \left\{ \frac{\tau_o(T) + t}{\tau_o(T) - t} \right\}^{C(T)} \quad (1)$$

$$\eta_o(T) = a \exp(b/T) \quad (2)$$

$$\tau_o(T) = d \exp(e/T) \quad (3)$$

$$c(T) = f/T - g \quad (4)$$

When $t = 0$, $\eta = \eta_o(T)$ \quad (5)

When $t = \tau_o(T)$, $\eta = \infty$ \quad (6)

where, $\eta$: viscocity, $\eta_o$: initial viscocity, $\tau_o$: gelation time, c : coefficient of viscocity rise, T : absolute temperature, t : time. a, b, d, e, f and g are parameters peculiar to resin not affected by the molding conditions. The characteristic of formula (1) at a suitable temperature T is shown in FIG. 5.

The resin within the mold is under the non-isothermal temperature state because it flows while receiving heat from the tube wall. The viscocity is estimated from the isothermal viscocity formulae below:
From the formula (1), $$\mu = \frac{1 + \tau}{1 - \tau} \quad (7)$$

where, $$\mu = \{\eta/\eta_o(T)\}^{1/C(T)} \quad (8)$$

$$\tau = t/\tau_o(T) \quad (9)$$

Figure 6:
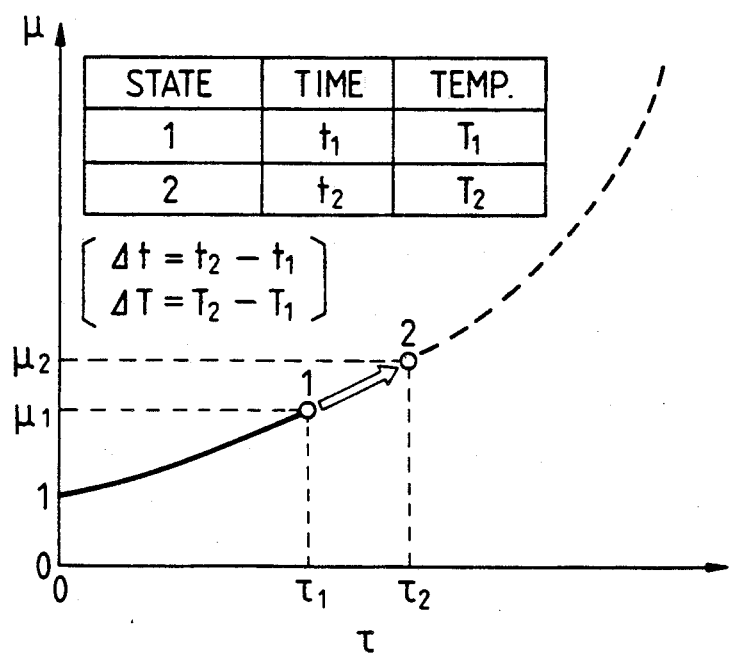
Figure 8:
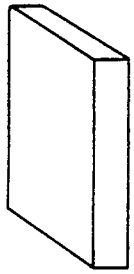

The formula (7) is a curve having the characteristic in which when $\tau=0$, $\mu=1$, and when $\tau=1$, $\mu=\infty$, as shown in FIG. 6. As shown in FIG. 6, when the state $(\tau_1, \mu_1)$, that is, $\tau=\tau_1$, increases by time $\Delta t$ and temperature $\Delta T$ from $\mu=\mu_1$, the state $(\tau_2, \mu_2)$ assumes. From the formula (9), $\tau$ is a function of t, T, and an increment $\Delta \tau$ of $\tau$ in the change of state can be obtained by $$\Delta \tau = \frac{\partial \tau}{\partial t} \Delta t + \frac{\partial \tau}{\partial T} \Delta T \quad (10)$$

$$= \frac{\Delta t}{d \exp(e/T)} + \frac{e\tau}{T^2} \Delta T \text{ (from formulae (3), (9))}$$

From the formula (7), $$\Delta \mu = \frac{\partial \mu}{\partial \tau} \Delta \tau = \frac{2}{(1 - \tau)^2} \Delta \tau \quad (11)$$

When $\tau_1$ is changed to $\tau_2$, the value of $\mu$ is given by $$\mu_2 = \mu_1 + \Delta \mu = \mu_1 + \frac{2}{(1 - \tau_1)} \Delta \tau \quad (12)$$

Substituting $T=T_2$ and $\mu=\mu_2$ in the following formula (13) obtained from the formula (8), $$\eta = \eta_o(T)\mu^{C(T)} \quad (13)$$

gives $$\eta_2 = \eta_o(T_2)\mu_2^{C(T_2)} \quad (14)$$

By repeating such a procedure from $\tau=0$ to $\tau=1$, the change of viscosity from the initial state in the nonisothermal state to the gellation state can be calculated.

In order to analyze the state in which resin flows into the flowpassage of the mold, it is necessary to solve simultaneously basic formulae of the aforesaid viscocity calculation method, the continuous formula, the motion amount conservation formula and the energy conservation formula. In the case of the circular tube flowpassage, model formulae are given as follows:

Continuous formula: $Q = 2\pi \int_0^R v_z \gamma dz$ \quad (15)

Motion amount conservation formula: $\frac{\partial P}{\partial z} = \frac{1}{\gamma} \frac{\partial}{\partial \gamma}\left(\gamma \eta \frac{\partial v_z}{\partial \gamma}\right)$ \quad (16)

Energy conservation formula: \quad (17)

$$\rho C\left(\frac{\partial T}{\partial t} + v_z \frac{\partial T}{\partial z}\right) = \frac{1}{\gamma} \frac{\partial}{\partial \gamma}\left(\gamma \lambda \frac{\partial T}{\partial \gamma}\right) + \eta \left(\frac{\partial v_z}{\partial \gamma}\right)^2$$

where, Q: flow rate, R: radius of circular tube, $v_z$: axial flow velocity, $\gamma$: diametral distance, z: axial distance, P: pressure, $\eta$: viscocity, $\rho$: density, T: temperature, t: time, $\lambda$: heat conductivity.

A basic analysis program for flow analysis registered in the program registration unit 25 has been developed on the basis of the model formulae as described above. While in the above description, only the circular tube flow passage has been mentioned, it is to be noted that preparation thereof is similarly made for the case of a flat plate flowpassage, a diffusion flowpassage and the like.

Figure 1:
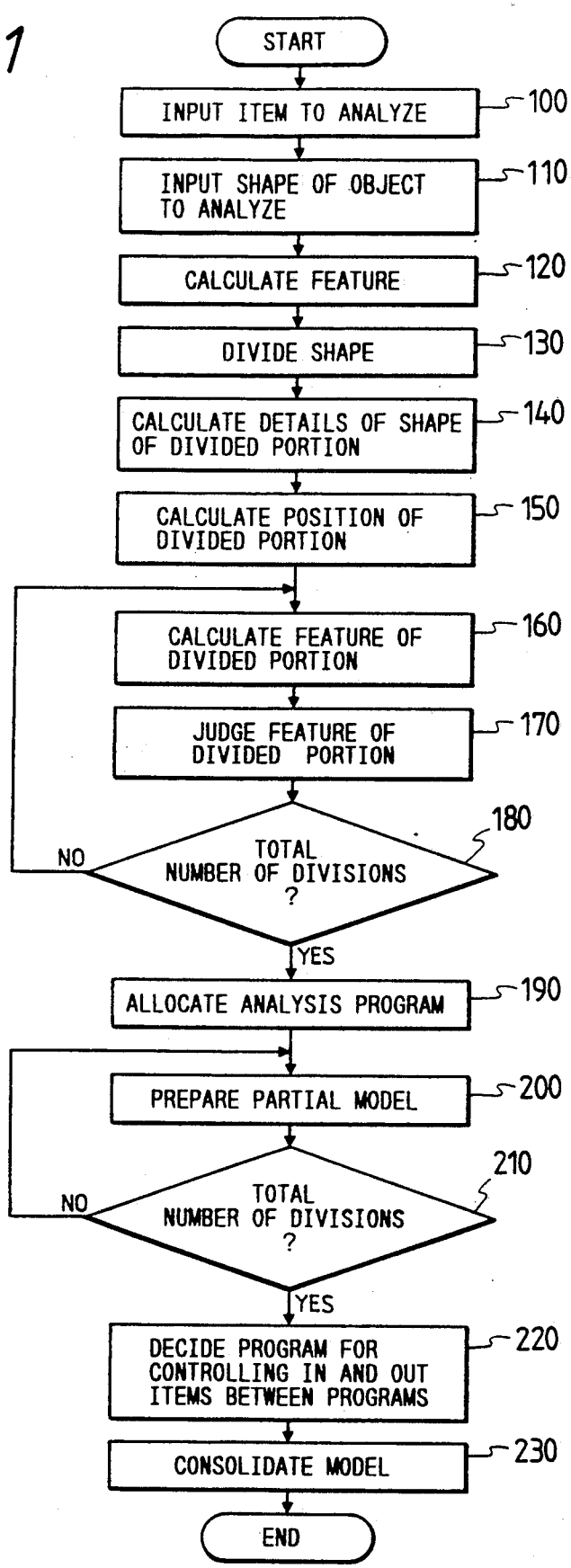
FIGS. 1 and 2 are respective views showing a schematic flow of a processing procedure as one example of a flow analysis system according to the present invention.
Figure 2:
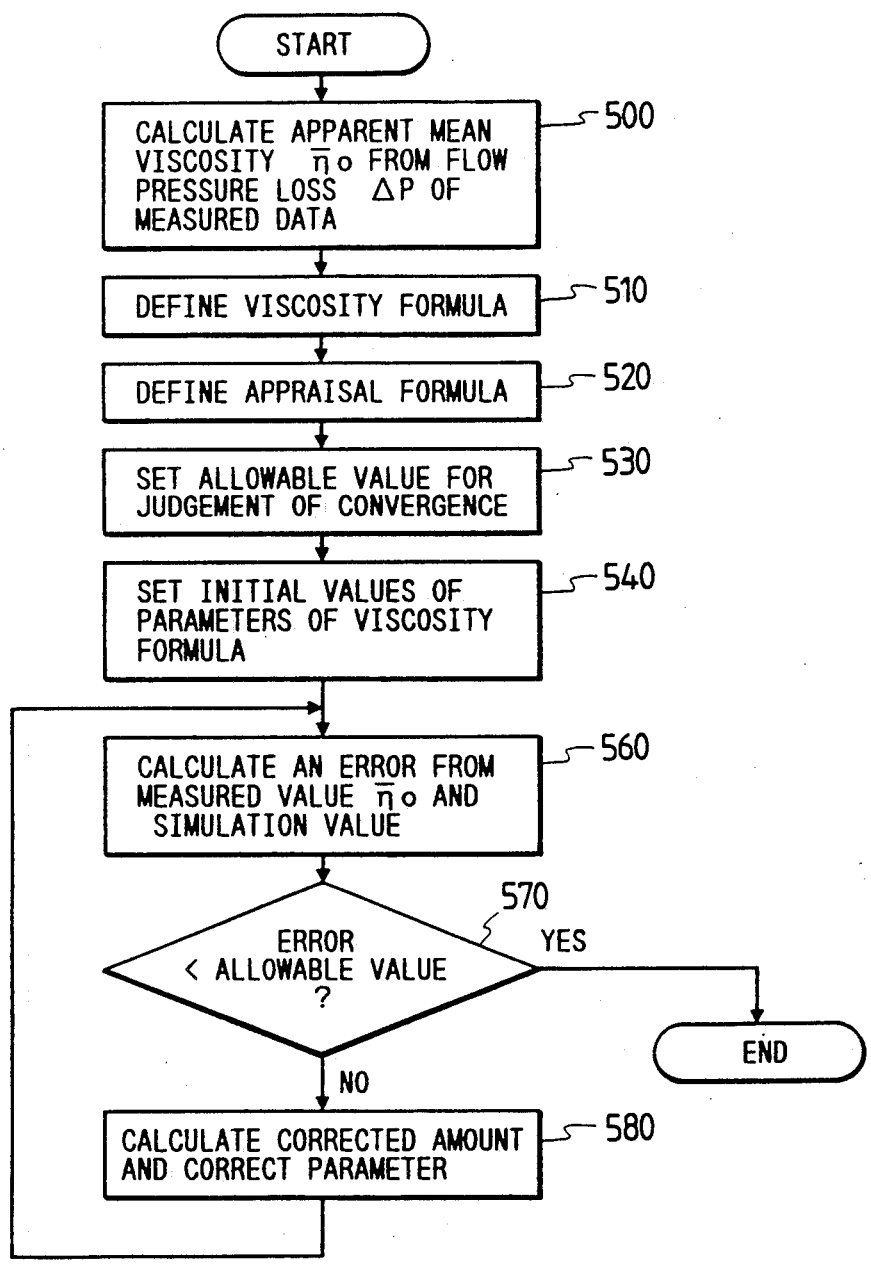

Now, if the present invention is described by way of the plastic flow analysis of a mold for molding a semiconductor plastic package, and design of particulars of mold flowpassages and molding conditions, and selection of plastic material (resin) applied on the basis of the result of analysis obtained therefrom, the processing procedure is as shown in FIG. 1.

Figure 11:
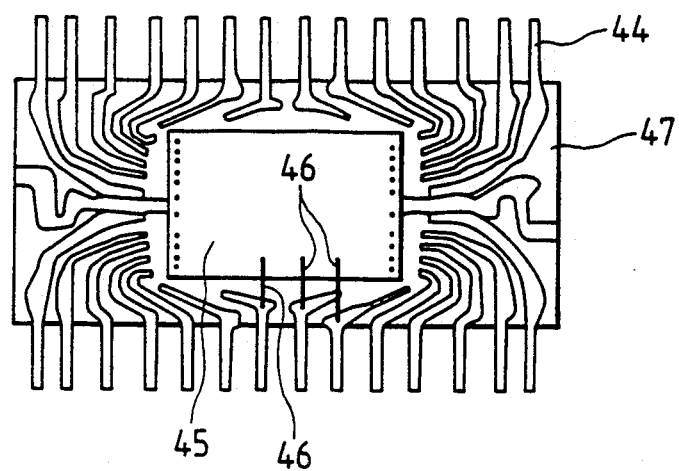
FIG. 11 illustrates an internal construction of a semiconductor plastic package.
Figure 12:
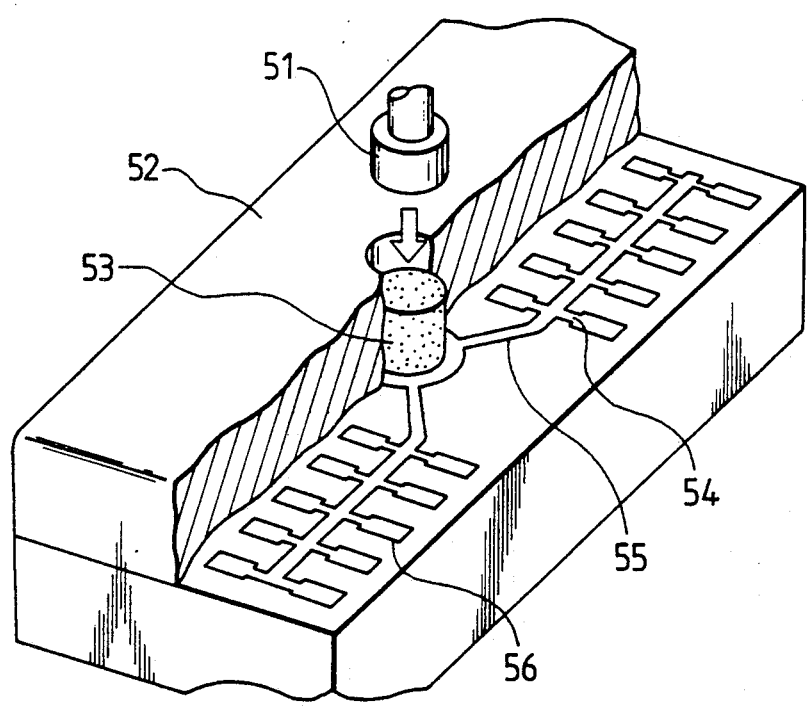
FIG. 12 illustrates a mold used to manufacture a plastic package.

That is, the background will be first explained with reference to FIGS. 11 and 12. A semiconductor plastic package is prepared by placing a semiconductor chip 45 on which a lead frame indicated at 44 in FIG. 11 is mounted into a cavity 56 of a mold indicated at 52 in FIG. 12, and pouring a resin 53 as a plastic seal material by means of a plunger 51 from a gate 54 (an inlet) of the mold cavity 56 to harden the resin. At that time, the flow analysis to see how the viscous resin 53 flows into the mold cavity 56 is carried out to thereby render possible the evaluation of particulars of the mold for an object to be designed. However, the resin material has thermoset properties in which the resin absorbs heat from wall surfaces of the mold, and the viscosity thereof considerably changes, which characteristic cannot be expressed by a definite theoretical formula. Experimentally, a program of a flow analysis model with respect to a simple shape of a flowpassage of a mold capable of measuring the viscocity has been developed, but the actual construction of a mold cavity is complicated. The flow analysis model with such complication taken into consideration cannot be prepared by only one kind of calculation method. In view of this, it is necessary to prepare an analysis model with the complication of the flowpassage shape taken into consideration by a combination of a plurality of analysis programs (models). In the case where an analyst forms a model in an attempt to carry out flow analysis with a mold cavity, there are registered in advance, into the program registration unit 25 stored in the disk device 18 prior to analysis are resin flow analysis programs $P_1$, $P_2$ and $P_3$, model preparation procedure programs $M_1$, $M_2$ and $M_3$ peculiar to the resin flow analysis programs $P_1$, $P_2$ and $P_3$, respectively, and input and output data conversion programs H(12), H(23), H(31), H(21), H(32), and H(13) (H (i, j): a program for converting output data of resin flow analysis program Pi into input data of resin analysis program Pj) A description will be made of the contents of the resin flow analysis programs $P_1$ to $P_3$ and the model preparation procedure programs $M_1$ to $M_3$ with reference to FIG. 8. The resin flow analysis program $P_1$ is to analyze a streamlined flow which evenly receives heat, termed as a circular tube flow from 360° around and can be applied to a flow portion of which heat source is present in a circumferential direction. Since the program $P_1$ uses a difference calculus, a model prepared by the modelling procedure program $M_1$ is prepared by converting a shape as an object (a shape of a portion through which resin flows) into a circular tube having the same flow sectional area. The resin flow analysis program $P_2$ receives heat only from a vertical direction termed as a flat plate flow to analyze a flow under the condition capable of ignoring heat transfer from a lateral direction (a low-level flat plate flow), and is prepared by use of a finite element method. Therefore, a streamline direction (a direction of flow) is automatically analyzed unlike the difference calculus, and need not be particularly designated and the modelling procedure program $M_2$ with respect thereto is prepared by dividing a model of a flow part shape into triangular meshes. The resin flow analysis program $P_3$ may be used under the condition wherein a flow radially proceeds from a flow opening at one point, and the modelling procedure program $M_3$ is in accordance with the difference calculus.

In the shape feature registration unit 242 and the shape division rule registration unit 243 of the know-how registration unit 24 are registered the division method of the cavity shape corresponding to the item (and its calculation formula) and features for calculating features of the shape of the mold cavity 41 schematically shown in FIG. 9. Here, the item for calculating the feature of the cavity shape and the content of the shape division method will be described. Main factors which govern a hardening reaction of resin include a heat transfer action from wall surface of a mold and internal elements (such as chips). It is therefore necessary to divide a shape at a point at which the heat transfer state in the mold cavity is different, that is, at a point in which the resin flow is separated by the internal elements 42 and then flows to obtain a portion in which the heat transfer state is constant. A criterion for the division of shape is a shape and a position of the chip 42 forming an internal element. Considering now the ratio between the width g of cavity 41 and the width h of chip 42, in the case where the width h of chip 42 is substantially the same as the width g of cavity 41, it is regarded that the flow is branched into upper and lower flows; conversely in the case where the width h of chip 42 is smaller by a certain ratio than the width g of cavity 41, it is considered that the flow is branched into four upper, lower, left and right flows. If the ratio $\alpha$ (=h/g) between the width h of the chip 42 and the width g of the cavity 41 is registered in the shape feature registration unit 242 and the description of judgement whether the division is divided into two upper and lower portions of the chip 42 by the value of said ratio $\alpha$ or into four upper, lower, left and right portions of the chip 42 is registered in the form of IF to THEN in the shape division rule registration portion 243, the division of the shape of the cavity 41 according to the shape feature becomes possible. In addition to the above, the shape feature forming the criterion of division includes the ratio between the length b of chip 42 and the length l of the cavity 41.

While the feature value forming a criterion for allocating analysis programs on a divided portion in addition to the feature item forming a criterion for division of the shape of the cavity is registered in the shape characteristic registration unit 242, items for deciding the analysis programs $P_1$, $P_2$ and $P_3$ include a streamline direction (a factor for deciding programs $P_1$ and $P_3$) and a shape (a height of flow forming a factor for deciding program $P_2$, uniformity of a heat source for deciding program $P_1$, that is, a longitudinal/lateral ratio of shape). Among them, the feature forming a criterion for judging a streamline direction considered is a ratio (g/i) between a width g of cavity 41 and a width (diameter) i of gate 43. Where the ratio g/i between the width g of cavity 41 and the width i of the gate 43 is large, it can be regarded to be a flow from a narrow place to a wide place, and the streamline can be judged to be radial. Conversely, where the ratio g/i is small, the streamline can be judged to be parallel. In this manner, the feature items forming a criterion for deciding an analysis program and formulae thereof are registered in the shape feature registration unit 241, and feature judging criteria ($\alpha$, $\beta$, etc.) with respect to the feature calculation result forming a criterion for deciding an analysis program are registered in the form of IF to THEN in the shape feature judgement rule registration unit 246. Now, the processing procedure shown in FIG. 1 will be described. When an analyst operates the keyboard 17 to input "Flow analysis" as an analysis item together with a name "X" of mold cavity as an object to be analyzed, the inputted analysis demand is taken into the system by the input unit 22 (100), and the name "X" of mold cavity is transmitted to the control unit 21 whereby particulars of cavity shape with respect to the cavity "X" within the disk device 18 is searched through the shape registration unit 241 by the control unit 21. In the case where flow analysis models cannot be synthesized merely by information registered in the know-how registration unit 24, the model interaction synthesizing unit 267 of the model synthesizing unit 26 is started by the control unit 21, and the analyst will to input necessary information through the output unit 23 to complete a flow analysis model. At that time, log information being processed is retained by the log retainer unit 268, and upon termination of processing by the model interaction synthesizing unit 267, the information is converted by the know-how forming unit 269 into the form capable of being registered into the know-how registration unit 24 whereby contradition thereof with respect to the existing know-how is solved to register it into the know-how registration unit 24. Since in this example, particulars of cavity shape of the mold with respect to the cavity "X" are not registered, the model interaction synthesizing unit 267 is started by the control unit 21 and the input of the shape particulars is demanded through the output unit 23, on the basis of which the analyst inputs the shape particulars of the mold cavity with respect to the cavity "X". Then, the shape particulars are retained by the log retainer unit 268 and function similarly to that being registered in the shape registration unit 241. That is, when the shape registration unit 241 is referred to, the log retainer unit 268 is also referred to (110). Thereafter, the control unit 21 instructs the shape feature calculation unit 260 to calculate the feature of the input shape. On the basis of this instruction, the shape feature calculation unit 260 reads the shape feature item and the calculation formula from the disk device 18 through the shape feature registration unit 242 and further reads the shape particulars with respect to the "X" from the disk device 18 through the shape registration unit 241. The unit 260 then calculates the feature values corresponding to the feature items, and the calculation result is registered in the shape feature registration unit 242 (120). In this manner, after the features have been calculated, the shape division unit 264 reads the feature values registered in the shape feature registration unit 242 and the shape division rules registered in the shape division rule registration unit 243 on the basis of instructions for dividing the shape of the mold cavity from the control unit 21 so as to judge how the shape of the mold cavity is divided. As a result, the mold cavity is divided into portions A to D, for example, as shown in FIG. 10 (130). On the basis of the aforesaid result of division, the shape division unit 264 calculates the shape particulars of the divided portions A to D from the shape particulars of the mold cavity registered in the shape registration unit 241, and names of parts and data of shape particulars thereof are delivered to the partial shape registration unit 245 (140). Then, particulars of partial shapes with part names indexed are registered in the disk device 18 by the partial shape registration unit 245. The shape division unit 264 further calculates the positional relationship of the divided portions A to D, which are registered in the divided portion position registration unit 244 (150). As shown in FIG. 10 as an example, the divided portions B and C are positioned in parallel next to the divided portion A, and the divided portion D is positioned next to the divided portions B and C. Thus, the positional relationship of the divided portions A to D are registered.

After the division of shape, the control unit 21 instructs the shape feature calculation unit 260 to calculate the features which form a criterion for allocation of analysis programs with respect to the divided portions A to D, on the basis of which the shape feature calculation portion 260 reads partial shapes of the divided portions A to D registered in the partial shape registration unit 245 and the feature items and calculation formula thereof registered in the shape feature registration unit 242 to calculate the feature values in accordance with the calculation formula, which values are then registered in the shape feature registration unit 242 (160). Then, the control unit 21 instructs the partial shape feature judging unit 265 to judge the features in terms of allocation of analysis programs of the divided portions A to D. The partial shape feature judging unit 265 reads the rule in the form of IF - THEN which presume factors for deciding the analysis programs from the feature values from the shape feature judging rule registration unit 246, and the feature values of the divided portions A to D from the shape feature registration unit 242, on the basis of which the factors forming a criterion for allocation of analysis programs of the divided portions A to D. The presumed result is registered in the partial shape registration unit 245 (170). For example, with respect to the divided portion A, a stream line "radial" and a flow height "height" are judged by the ratio between the width of the gate which is an inlet and the width of flow; with respect to the divided portions B and C, a flow height "low" is judged; and with respect to the divided portion D, a stream line "parallel" and a flow height "height" are judged.

After the feature judgement with respect to all the divided portions A to D has been terminated in a manner as described above, the control unit 21 instructs the analysis program allocation unit 261 to allocate the analysis programs with respect to the divided portions A to D. The analysis program allocation unit 261 reads the features of the divided portions A to D registered in the partial shape registration unit 245, which features are registered in the program registration unit 25. Among the flow analysis programs, those matched in program using condition to the features of the divided portions A to D and names of model preparation programs peculiar thereto are registered in the partial shape registration unit 245 (190). As a result, the analysis program $P_3$ and the model preparation program $M_3$, the analysis program $P_2$ and the model preparation program $M_2$, and the analysis program $P_1$ and the model preparation program $M_1$ are allocated in the divided portion A, divided portions B and C, and divided portion D, respectively. Thereafter, the control unit 21 instructs the model preparation unit 262 to read the model preparation programs of the divided portions A to D registered in the partial shape registration unit 245 and particulars of shapes thereof so as to prepare models for each of the divided portions A to D (200). The thus prepared models have their names of parts registered as indexes in the disk device 18 through the model registration unit 240.

After preparation of models with respect to the divided portions A to D has been terminated (210), the control unit 21 instructs the input and output item control unit 263 to control the input and output items required in continuously analyzing the divided portions A to D. The input and output item control unit 263 reads the positional relationship of the divided portions A to D from the divided portion positional relation registration unit 244, and names of programs to analyze corresponding to the divided portions A to D from the partial shape registration unit 245 so that data conversion programs for controlling the input and output data of a connecting section of analysis programs for which input and output item control of analysis data is required, that is, the divided portions A→B, A→C, B→D and C→D are searched by the program registration unit 25. As a result, A→B corresponds to data conversion program $H_{32}$, likewise A→C to data conversion program $H_{32}$, and B→D and C→D to data conversion program $H_{21}$, respectively. These conversion program names are registered in the divided portion positional relation registration unit 244 (200). Thereafter, the control unit 251 instructs the analysis model consolidation unit 266 to consolidate analysis programs and models corresponding to the divided portions A to D, respectively, and input and output conversion programs so as to prepare a single model as a whole (230). In the analysis consolidation unit 266 are read analysis program names corresponding to the divided portions A to D from the partial shape registration unit 245, modelled results corresponding to the divided portions A to D are read from the model registration unit 240, and data conversion program names corresponding to adjacent portions are read from the divided portion positional relation registration unit 244, which are then edited as the analysis execution procedure. In the program execution unit 28, according to the aforesaid analysis execution procedure, a flow analysis model as a whole within the mold cavity is automatically formed in the form wherein analysis programs $P_1$, $P_2$ and $P_3$ are mixed.

As described above, according to the present embodiment, in the case where analysis for which analysis procedure is not established as in the flow analysis within the mold cavity in connection with the designing of a semiconductor plastic package is carried out, a plurality of existing analysis programs are combined to automatically form an analysis model which enables a flow analysis as a whole.

Next, how the analysis model synthesizing function provided in the flow analysis system according to the present invention behaves will be described with reference to the image plane transition shown in FIG. 13.

This example shows the process in which an analyst inputs a proposed design of a mold for a semiconductor to synthesize flow anaylsis models according to the shape or the like thereof.

First, a designer instructs to carry out flow analysis in connection with particulars of a mold flow-passage registered in advance. Then, as shown in FIG. 13(a), an image plane is displayed. The image plane is composed of a message display window 61 for displaying a message from the system, a window 62 for displaying the entire figure of a mold which always displays the entire mold flowpassage, a window 63 for displaying a partial view of a mold which displays an enlarged view of a part of a mold flowpassage, a figure in which a point of view is changed or a part of a mold is shown after being divided, a menu forming a criterion when a user divides a shape in an interactive manner, for example, a branch type menu 64 for selecting a flow branch state of resin in a mold, and a shape type menu 65 for selecting a basic shape in which corresponding relationship with an analysis program is obvious.

First, an analyst divides a mold shape indicated in FIG. 13(a) into units that may be analyzed by an analysis program. At that time, interactive division-/automatic division selection areas (69, 70) defined on the mold entire figure display window 62 are selected by used of a mouse or the like to select modes, whether the shape division is effected automatically or interactively. In the case where the automatic division is selected shape features in terms of shape division registered in advance are calculated, and the shape division according to the aforesaid feature is automatically carried out. The mold shape is divided into units of the basic shape type which is apparent in the corresponding relation with the analysis program as shown in FIG. 13(c). FIG. 13 (d) shows that an enlarged function 71 defined on the message display window of FIG. 13(c) is selected by use of a mouth or the like, and the result of the shape division is enlarged in the periphery of the mold cavity. It is understood that the shape division corresponding to the case where upper, lower, left and right branch flows of chips occur in consideration of the branch flow of resin caused by elements (chips) placed within the cavity.

Figure 13B:
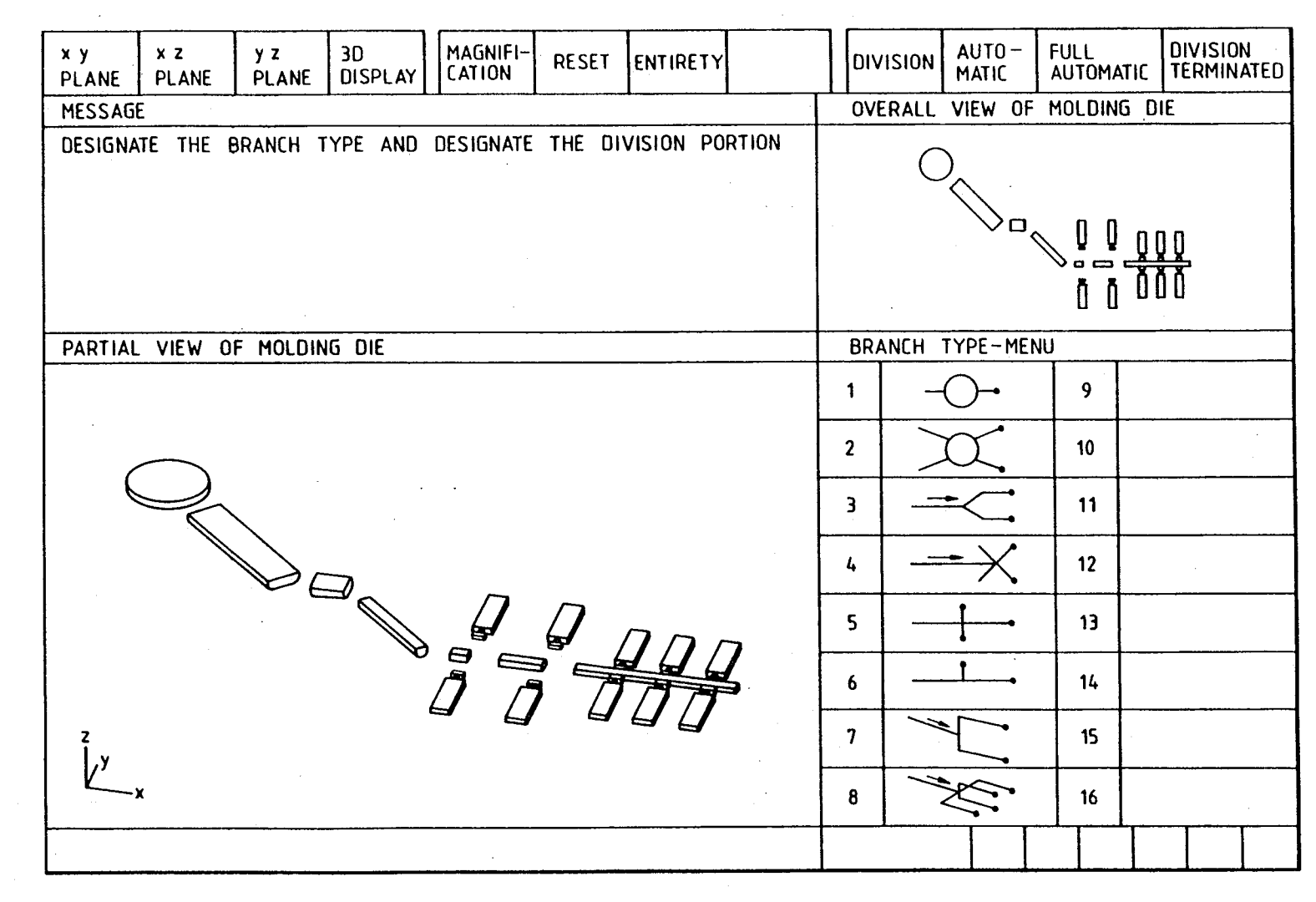
Figure 13C:
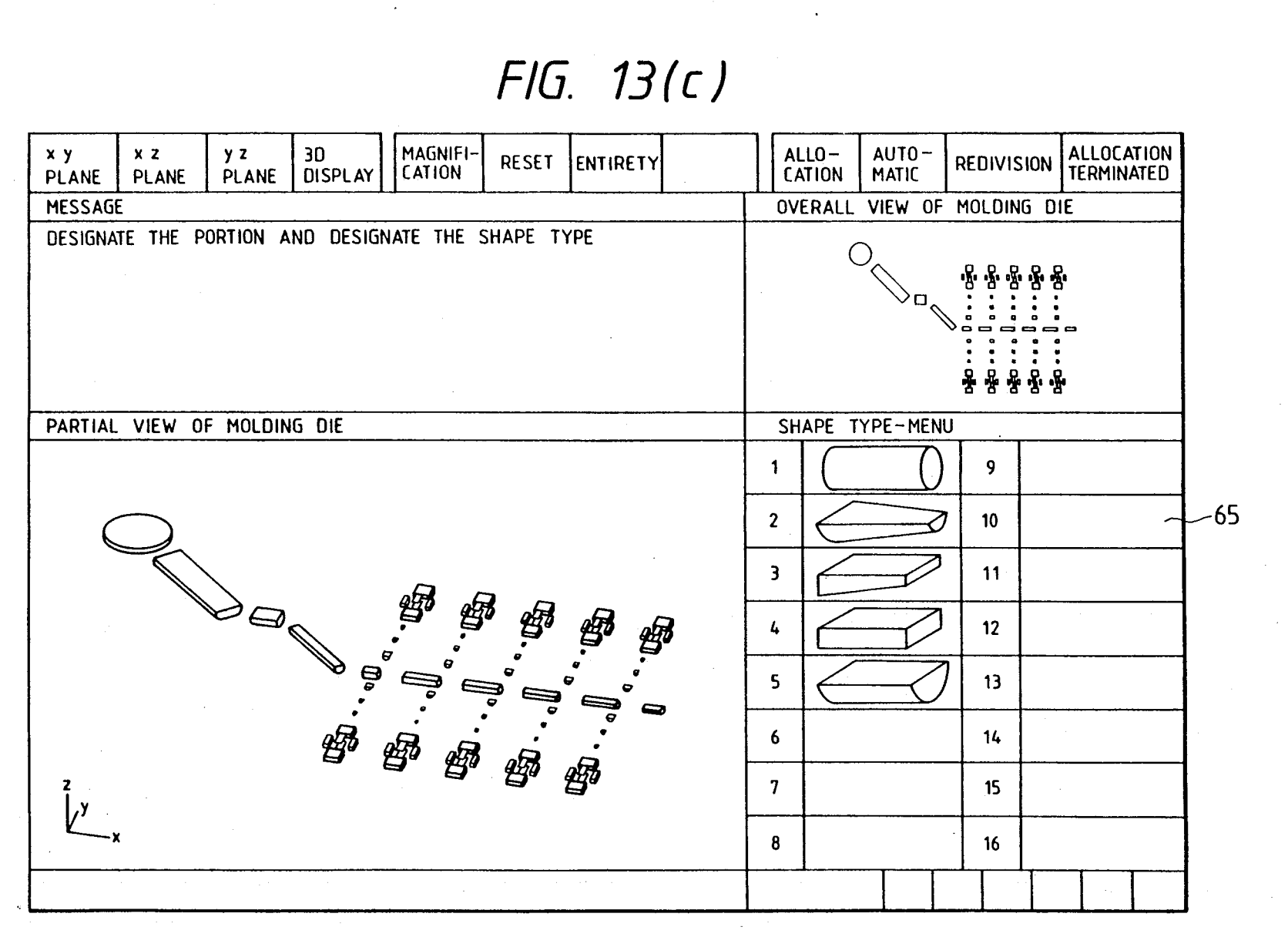
Figure 13D:
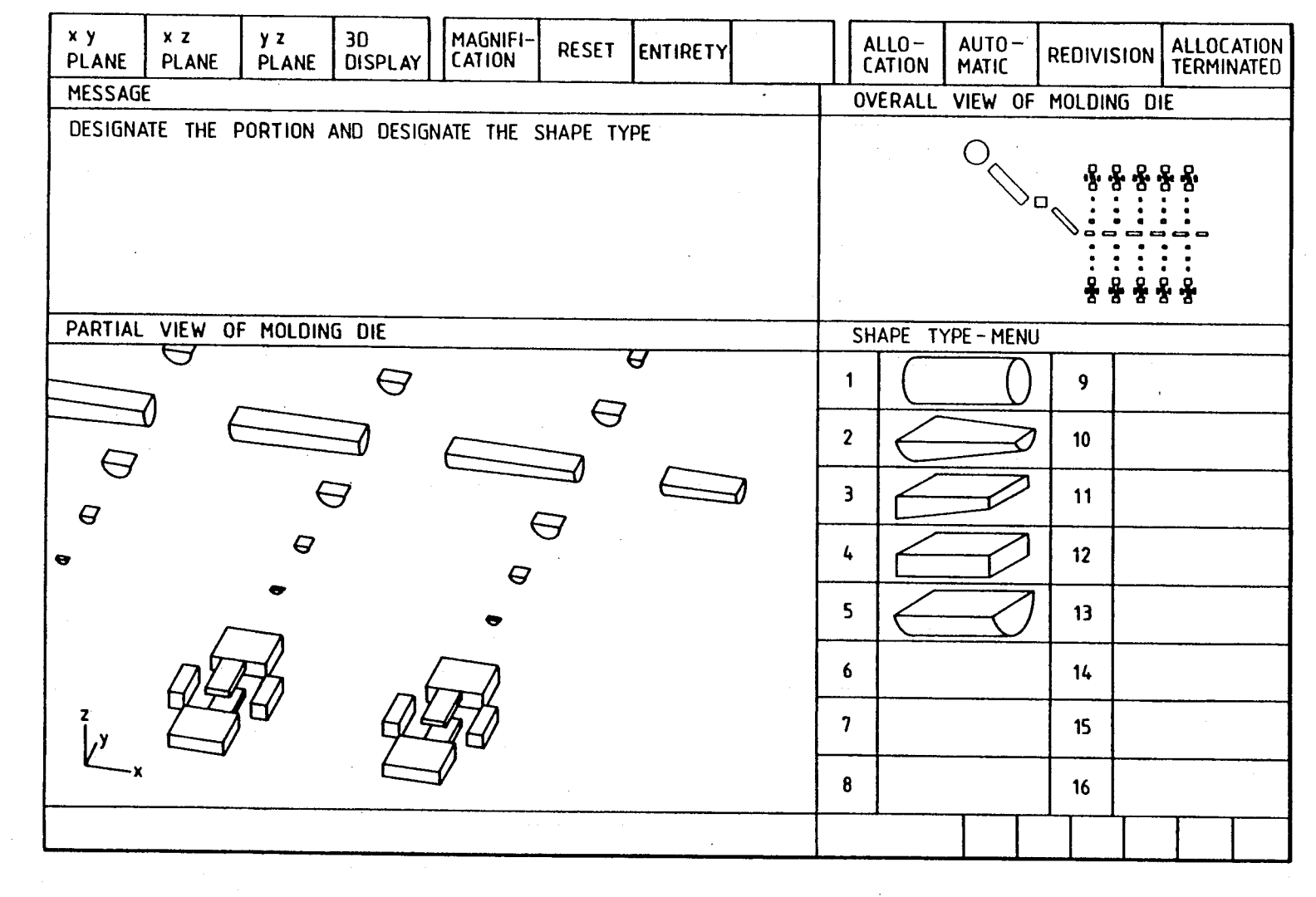

In the shape division, in the case where the interactive division is selected, the user uses the branch type menu 64 or shape type menu 65 as shown in FIG. 13(b) to divide the mold shape while grasping the feature of shape in an interactive manner. In the stage in which the shape division has been terminated, an image plane as shown in FIG. 13(c) results similar to the automatic division.

After the shape division has been terminated so that the mold shape has been divided into units that may be analyzed by the analysis program, suitable analysis programs are allocated to the respective portions. In this analysis program allocation step, an image plane having a structure shown in FIG. 13(c) is displayed. The image plane is composed of an actual shape display window 66 for displaying an actual shape of a mold divided in shape, a window 67 of a list of analysis Programs for displaying analysis program names prepared by types of resin flows such as a circular tube flow, a flat plate flow and a diffusion flow, and a model shape display window 68 for displaying model shapes provided on the divided portion of a mold.

Figure 13E:
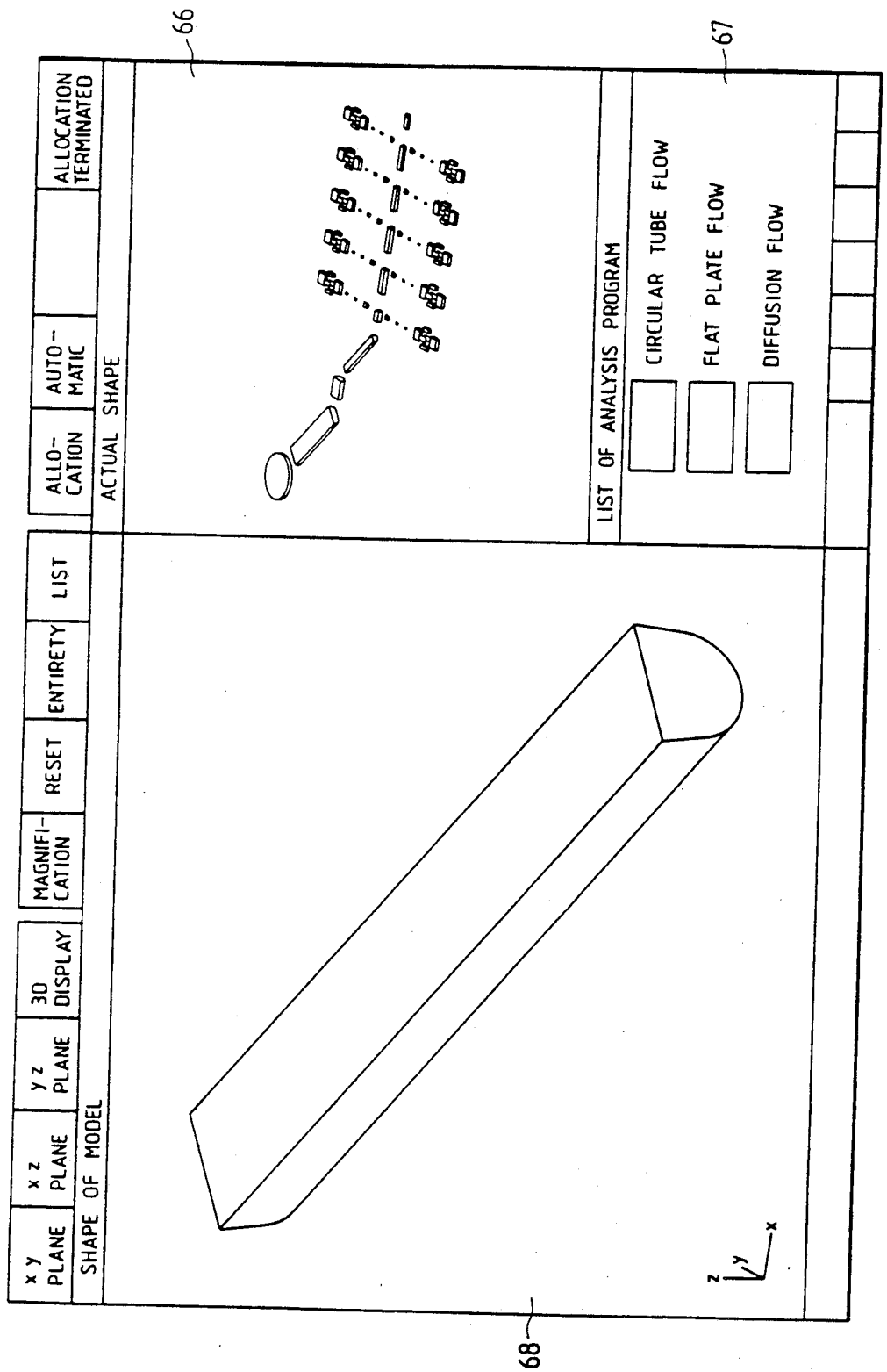
Figure 13F:
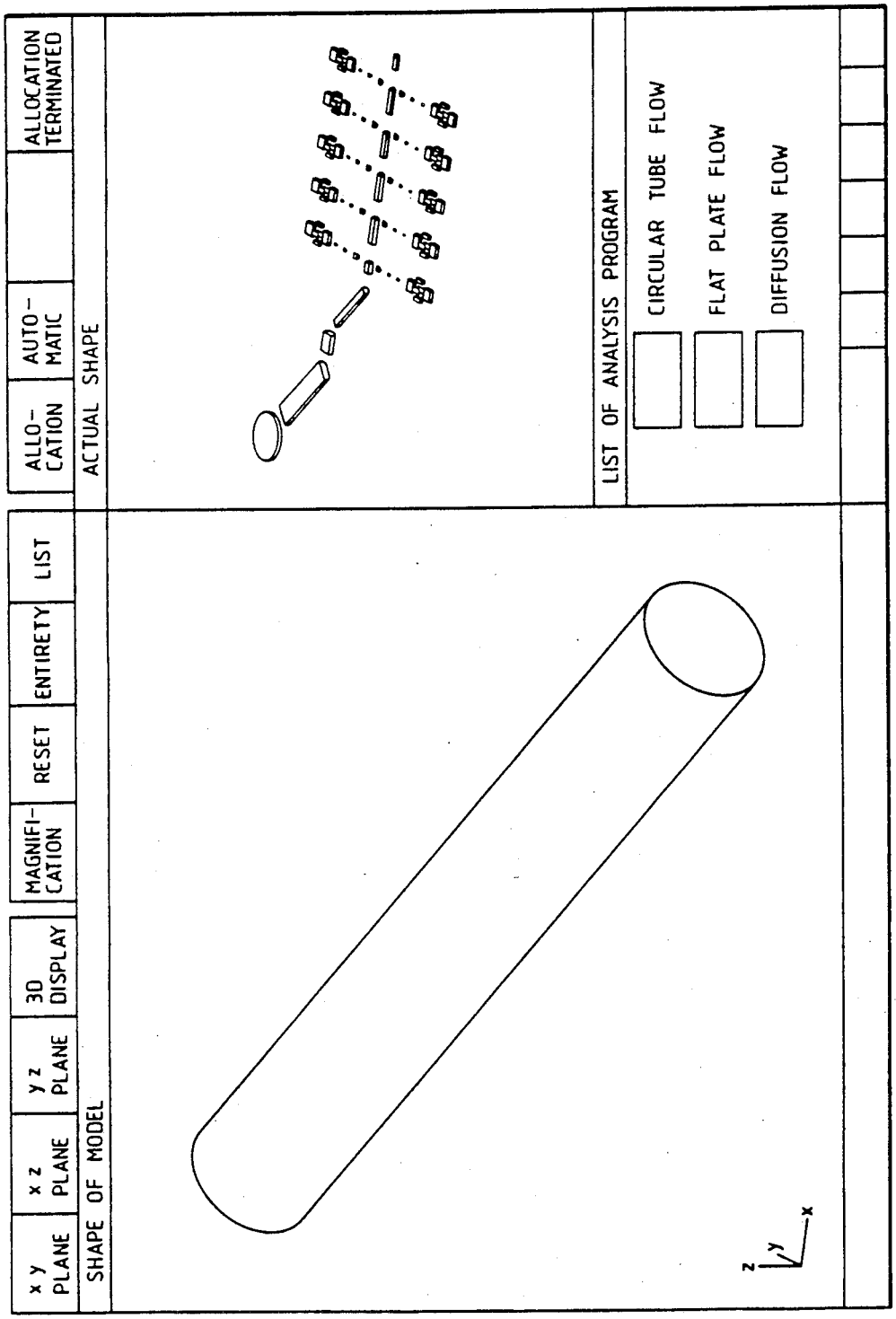
Figure 13G:
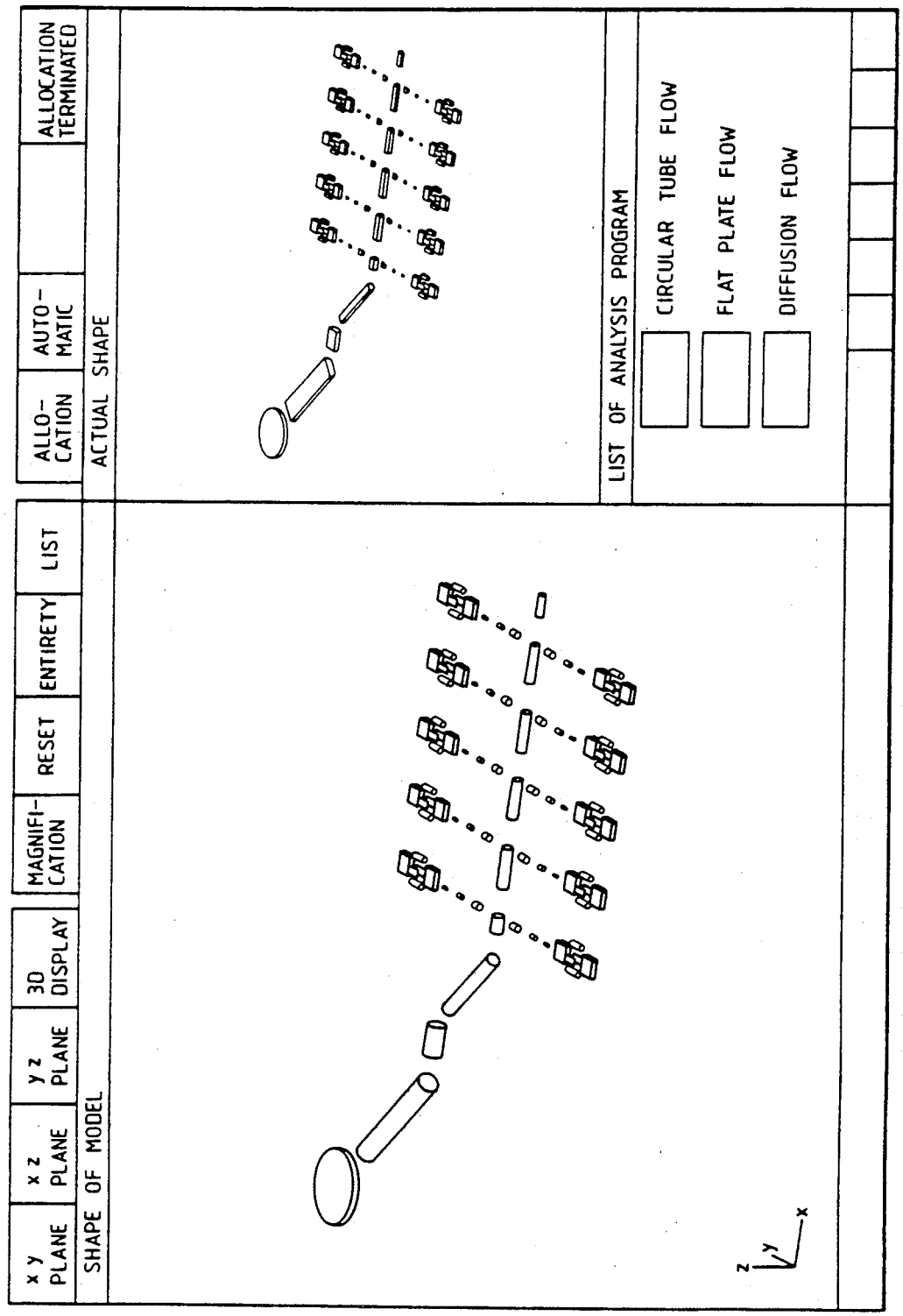
Figure 13H:
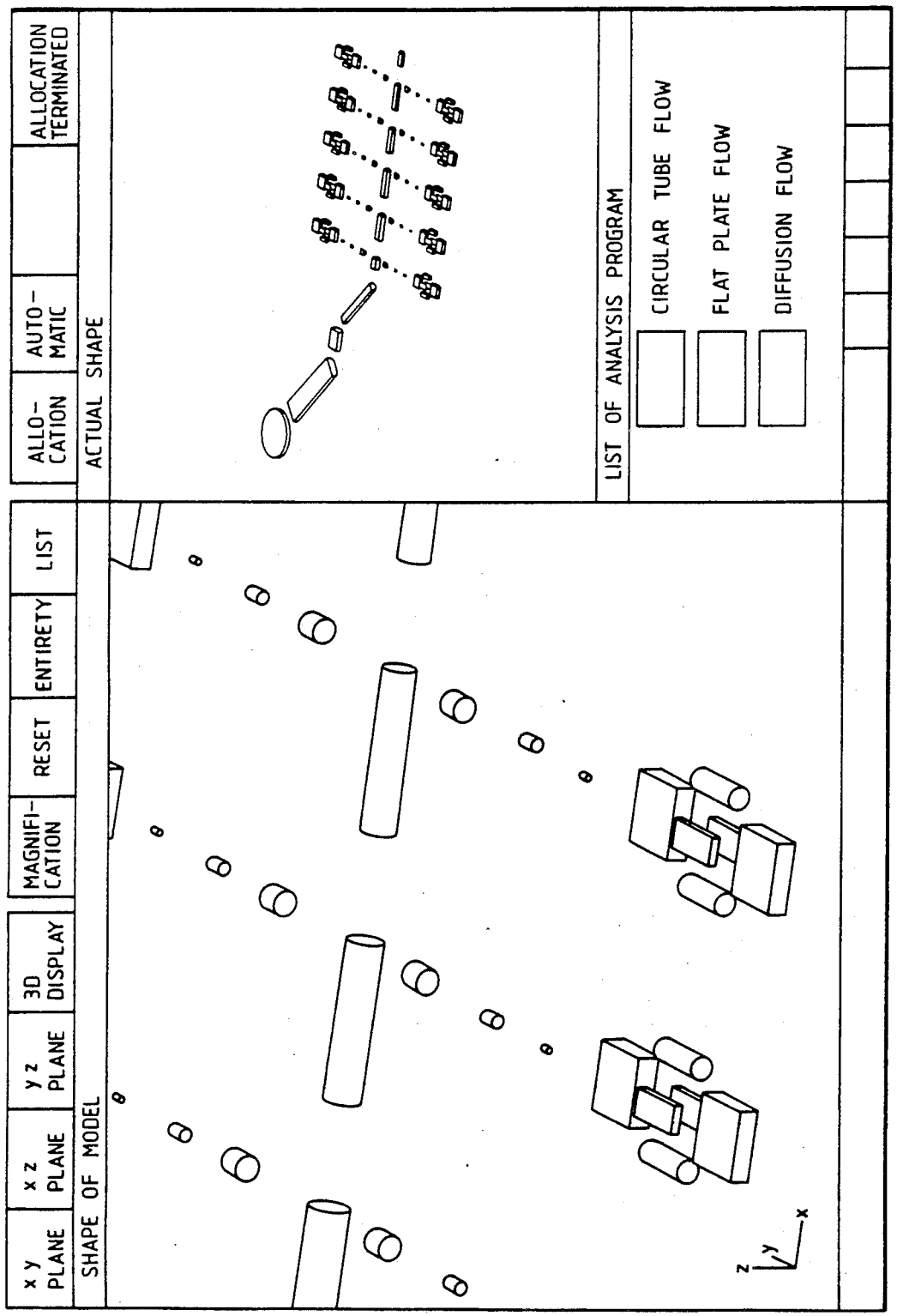

First, a divided portion (in this case, a runner portion in a mold flowpassage) as displayed on the model shape display window 68 of FIG. 13(e) is displayed. Next, the value of the shape feature of the divided portion is calculated, the shape feature is judged from the shape feature value, and an analysis program according to the shape feature is decided. In the case of FIG. 13(e), the type of the analysis program is decided to be a circular tube flow from a flatness of the divided portion having a shape of a semicircular bottom. Next, a modelling program peculiar to a circular tube flow program is started, details of a model such as radius of a circular tube are decided from the particulars of the divided portion having a shape of a semicircular bottom, and a model shape as shown in FIG. 13(f) is displayed. The above-described allocation of models is carried out for all the other divided portions, and finally, analysis models with respect to the entire mold as shown in FIG. 13(g) can be synthesized. An image plane shown in FIG. 13(h) is an enlarged view of the periphery of a cavity among model shapes with respect to the entire mold shown in FIG. 13(g). In the case of this example, it is understood that a flow model within the cavity is modelled as a diffusion flow program in the vicinity of an inlet, as a flat plate flow program at the upper, lower and rear portions of the chip, and as a circular tube flow program sideway of the chip.

In this manner, the analysis programs allocated to the divided portions are executed while being sequentially connected in reliance upon the positional relation of the respective portions registered at the time of the shape division whereby the flow analysis of the entire mold can be made.

As described above, according to the present embodiment, analysis models which enable the resin flow analysis of the entire mold flowpassage including the interior of the mold cavity in connection with the design of a semiconductor plastic package can be simply synthesized as a combination of basic flow programs.

An example of the case where the flow analysis according to the present invention is applied to the evaluation of material which evaluates viscosity of resin in the flowing state within the mold will be described hereinafter.

First, the unit 27 for presuming parameters of resin characteristic formula which is a constituent element of the present system will be briefly described.

A semiconductor plastic package as an object in the present system is sealed by and formed of a thermoset resin which induces hardening reaction by heat. The basic formula (see formula (1)) indicative of the viscosity characteristic of resin has six parameters a, b, d, e, f, and g perculiar to the resin. In prior art, they have been decided in a trial and error manner while manually depicting a graph. Therefore, if it takes a period more than one month in order to decide fully satisfactory parameters, accuracy of the viscocity formula becomes uneven depending on the deciding person. The quality (good or bad) of the parameters of the viscocity formula depends on whether or not the apparent mean viscosity obtained through simulation by use of formula (1) with the decided parameters coincides with the apparent means viscosity obtained from a measuring device. The viscocity is obtained in the following manner.

An error is evaluated from an apparent mean viscocity $\bar{\eta}_o$ calculated by use of the formula of Hagen-Poiseuille below:

$$\bar{\eta} = 980 \cdot \Delta P / (\beta \cdot Q) \quad (21)$$

where $\bar{\eta}$: apparent mean viscosity, $\Delta P$: pressure loss, $\beta$: shape resistance, Q: flow rate from the flow pressure loss P of the measured data, and an apparent mean viscosity $\bar{\eta}$ obtained as the result of simulation under the same condition as the measuring condition by use of formular (1). The evaluation formula used is $$G(\alpha) = \int_\Gamma d(\bar{\eta}^*, \bar{\eta}_o) d\Gamma \quad (22)$$

where, $\alpha$: parameters of a viscosity formula of (a, b, d, e, f, g) in the form of vector, $\Gamma$: regions, (time, tube diameter, temperature of mold), $d(\bar{\eta}^*,\bar{\eta})$: distance between $\bar{\eta}^*$ and $\bar{\eta}_o$, ex $(\bar{\eta}^*-\bar{\eta}_o)^2$, $|\bar{\eta}^*-\bar{\eta}_o|$.

To obtain the optimum parameters of resin-viscosity formula is to obtain $\alpha = \alpha_o$ in which $G(\alpha)$ is minimum. That is, $$G(\alpha_o) = \min G(\alpha) \quad (23)$$

$\alpha_o$ given by the formula (23) is to be obtained. Further, if $F(\alpha)$ is defined by $$F(\alpha) = \frac{\partial G(\alpha)}{\partial \alpha} \quad (24)$$

that is, $(f_1(\alpha), \ldots, f_6(\alpha))^T$ $$= \left( \frac{\partial G(\alpha)}{\partial \alpha}, \ldots, \frac{\partial G(\alpha)}{\partial g} \right)^T$$

the formula (23) corresponds to obtain $\alpha = \alpha_o$ as given by $$F(\alpha) = 0 \quad (25)$$

If $F(\alpha)$ is teller developed around $\alpha$, $$F(\alpha + \Delta\alpha) = F(\alpha) + F'(\alpha) \cdot \Delta\alpha + \quad (26)$$

Ignoring terms higher than second order of $\Delta\alpha$, $$\Delta\alpha = -[F'(\alpha)]^{-1} \cdot \Delta\alpha \quad (27)$$

The repetition of formula (25) of a non-linear equation can be defined as follows.

$$\begin{aligned} \alpha_n &= \alpha_n + \Delta\alpha_n \\ &= \alpha_{n-1} - [F'(\alpha_{n-1})]^{-1} \cdot F(\alpha_{n-1}) \end{aligned} \quad (28)$$

By providing a suitable initial value of $\alpha_n$, parameters of a viscocity formula can be determined by repeating the repetition formula shown in the formula (28) till it is converged.

The above-described algorithm is realized by the material characteristic formula parameter assuming unit 27 (see FIG. 4a). In the case where an analyst uses the present system to presume the viscocity formula parameters, the experimental data registration unit 271 of the unit 27 is started by the control unit 21 in accordance with the input of the analyst from the keyboard 17, and the flow pressure loss P obtained from the measuring device is registered in the disk device 18 through the communication circuit. When the flow pressure loss is registered in the disk device 18, the experimental data registration unit 271 uses the formula (21) to change the apparent mean viscocity, and the data is also registered in the disk device 18 (500). When the analyst inputs the instructions from the keyboard 17, the characteristic formula defining unit 272 of the assuming unit 27 is started by the control unit 21. The characteristic formula defining unit 272 demands the analyst to define the viscocity formula (formula (1)) through the display device 16. When the analyst inputs the viscocity formula (formula 1) in the keyboard 17 in accordance with the message of the disk device 16, that viscocity formula is taken into the system (510). Next, the control unit 21 starts the difference appraisal formula defining unit 273 which demands the input of the difference appraisal formula (formula (22) through the disk device 16. When the analyst inputs the difference appraisal formula (formula (22)) from the keyboard 17 in accordance with the message of the display device 16, the difference appraisal formula is taken into the system (520). Then, the control unit 21 starts the difference appraisal unit 274. The difference appraisal unit 274 uses the difference appraisal formula to calculate the difference as follows. First, the measuring condition stored along with the measuring data in the display device 16 is taken out, and sent to the model synthesizing unit 26 through the control unit 21 to form a flow analysis model capable of being subjected to flow analysis under the same condition as the measuring condition. Then, the program execution unit 28 executes the analysis program in accordance with the flow analysis model. At that time, As a viscocity formula, the formula inputted by the characteristic formula defining unit 272 is used. Using the apparent mean viscocity at various parts and time obtained by the execution of the program execution unit 20, the difference is calculated by the difference appraisal formula defined by the difference appraisal formula defining unit 273 (560). If the difference is less than an allowable value, the difference appraisal unit 274 terminates its operation. However, if the difference exceeds an allowable value, the control unit 21 demands the parameter correction amount calculation unit 275 to start (570). The control unit 21 starts the parameter correction amount calculation unit 275. The parameter correction amount calculation unit 275 obtains a correction amount of a viscocity formula parameter by the repetition formula shown in the formula (28) to correct the viscocity formula parameter (580). After correction, the parameter correction amount calculation unit 275 demands the control unit 21 to start the difference appraisal unit 274, then the control unit 21 starts the difference appraisal unit 274. The difference appraisal unit 274 repeats the above-described process to make the difference less than the allowable value.

In the manner as described above, the viscocity formula parameters are obtained.

As described above, according to the present embodiment, the flow characteristic of the sealing material for the semiconductor plastic package within the mold flow-passage can be subjected to quantitative appraisal as parameters of the viscocity formula, and selection of the sealing material can be easily accomplished.

According to the analysis model synthesizing method of the present invention as described above, a plurality of analysis programs according to the shape of an object to be analyzed are combined to automatically form an analysis model as a whole. Accordingly, in the case where analysis programs capable of analyzing a specific portion of an object to be analyzed with high accuracy without limiting to a specific analysis procedure or a novel analysis procedure is developed, these programs or analysis procedure can be reflected on the analysis without addition of a considerable change to the analysis system.

Furthermore, a plurality of analysis programs are combined without requiring professional knowledge of the existing analysis program, whereby analysis can be attained while flexibly coping with an object to be analyzed having a complicated shape, an object for which analysis procedure is not established and an object to be analyzed having a variety of shapes.

Moreover, no individual difference occurs in the result of analysis, and time required for preparation of analysis models can be considerably reduced.

Furthermore, by use of the flow analysis system according to the present invention provided with the analysis model synthesizing method, the following effects may be obtained.

(1) Even with internal elements, such as chips, lead frames, and Au wires within a mold cavity, as in a mold for a semiconductor, flow analysis models can be synthesized according thereto, and therefore, analysis and appraisal can be accomplished while meeting to the shape of a mold flowpassage, flow controlling conditions, and materials.

(2) Flow analysis models can be re-synthesized so that the flow analysis can be accomplished even with respect to the change in shape of the mold flowpassage, flow control condition and material on the basis on the change in proposed design resulting from the quality of molding with respect to the flow analysis models synthesized by use of the present invention. Therefore, the flow analysis can be effected while adjusting to the trial and error analysis.

(3) Since the viscocity estimate formula of the thermoset resin flowing in the mold can be automatically determined from the experimental data, the analysis of a mold for a semiconductor plastic package can be carried out with high accuracy.

(4) Since the flow analysis results can be displayed on one and the same image plane so that they can be compared and evaluated from many angles, evaluation of the propriety of the analysis results can be easily done.

(5) Since know-how, and analysis programs can be added and registered so that the object of analysis and range of analysis may be extended as needed, it is possible to flexibly cope with the change in object to be analyzed and higher degree of contents to be analyzed.

(6) In the already registered know-how (the relationship between the already registered shape feature and the analysis model), even the object for which flow analysis models cannot be synthesized, if they are once subjected to interaction processing, flow analysis models can be synthesized.

(7) The flow analysis system according to the present invention is started in the work station whereby the mold designer can evaluate particulars of mold and the like as needed.

(8) The flow analysis system according to the present invention is started on the work station and host computer device, whereby the shape of the flowpassage, the value of the material characteristic and the flow control condition may be easily inputted, and a large-scaled computation can be effected at high speed. Data base (relative technical information) often connected to the host computer can be utilized.

(9) Not only the flow analysis but also composite analysis based on information obtained from the flow analysis can be carried out, and the object to be analyzed can be subjected to synthetic evaluation.

(10) The present invention is applied to development of molds for a semiconductor plastic package whereby evaluation of mold and evaluation of molding conditions can be easily accomplished. Therefore, it is possible to prepare molds which are high in moldability and high in efficiency of using plastic material.

(11) The present invention is applied to development of plastic material whereby a viscosity characteristic during flowing in the mold can be evaluated. Therefore, it is possible to determine a component constituent from a view point of moldability to develop material.

What is claimed is:

1. A method for synthesizing analysis models of an object by way of a numerical analysis system, the method comprising the steps of: registering in advance a corresponding relationship between respective analysis programs and each of a plurality of shapes and features of an object; when information identifying a shape of an object to be analyzed is input, shape-dividing the object into portions to be analyzed on the basis of a shape and feature obtained from said shape identifying information, and selecting the analysis programs which correspond to the shapes of the divided portions; and controlling input and output items between adjacent divided portions of the object on the basis of the positional relationship between the portions and input and output information of the analysis programs which correspond to the divided portions.

2. A system for calculating a flow state of material to evaluate a flowpassage shape, a flow control condition, and the material, the system comprising: input means for inputting information identifying a flowpassage shape, a valve of material characteristic, and a flow control condition; model synthesizing means for extracting a feature of shape from the flowpassage shape input by said input means, for judging an adaptability with respect to an analysis model registered in advance from extracted feature of shape and for synthesizing flow analysis models for analyzing the entire flowpassage; and program execution means for taking out from an analysis library programs registered in advance to the individual analysis models of the synthesized flow analysis models, for delivering the value of material characteristic and the flow control condition inputted by said input means to the taken out programs and for sequentially executed said programs.

3. The system according to claim 2, further including model reconstruction means for reconstructing a flow analysis model with respect to a change in part of the input data to thereby flexibly adjust the flowpassage shape, flow control condition, and material to effect analysis and evaluation of the flow state.

4. The system according to claim 2, wherein said system is used for designing a mold, whereby prompt evaluation can be made with respect to a change in specification of the shape of mold flowpassage, molding conditions, and resins.

5. The system according to claim 2, which includes analysis result registration means for registering analysis results produced in said system, and result display means for displaying a previously analyzed result registered in said analysis result registration means and a present analysis result so that both the results can be simultaneously and easily compared, and the validity of the analysis result can be evaluated.

6. The system according to claim 2, which includes know-how registration means for registering the relationship between a shape feature, which is know-how for constructing an analysis model, and an analysis model; and program registration means for registering a group of programs for executing an analysis model on a computer, and in which an object to be analyzed and a range of analysis can be sequentially extended.

7. The system according to claim 6, wherein output data obtained from the result of flow analysis is used to register the relationship between the analysis model for performing analysis of higher degree and the output result in said know-how registration means, and said analysis model program is registered in said program registration means whereby not only the flow analysis but the analysis related to the flow analysis are carried out in combination.

8. The system according to claim 2, further comprising a work station composed of a bus serving as a signal transmission path, a bus control device connected to said bus controlling said bus, a central processing unit connected to said bus, a disk control device connected to said bus, a main memory connected to said central processing unit, a display device and a keyboard connected to said central processing unit, and a disk connected to said disk control device, wherein said main memory stores said model synthesizing means and said program execution means, said disk stores information as to the adapting relationship between the shape feature and the analysis model and an analysis library, and said central processing unit controls work station operation.

9. The system according to claim 8, further including a communication control device connected to the bus in said work station to transmit data fed from said bus to other devices and receive data from the other devices; and a host computer comprising a host bus for carrying out data communication with said work station through a modem, a bus control device connected to the host bus for controlling said host bus, a central processing unit connected to said host bus, a disk control device connected to said host bus, a communication control device connected to said host bus and said modem, a main memory connected to said central processing unit, and a disk connected to said disk device, wherein said host computer stores said model synthesizing means and said program execution means, said disk stores an analysis library, said input means and said model synthesizing means are executed on the side of said work station, the synthesized flow analysis model is transmitted by said communication control device, said program execution means is executed at high speed on the side of said host computer, the result of computation is transferred by said communication control device to said work station, and the result thereof can be confirmed on the display on the side of said work station.

10. A flow analysis system comprising: model interactive synthesizing means for dividing a shape into partial shapes by interactive process, for defining a feature amount in an interactive manner and for allocating an analysis model to a partial shape; log retainer means for retaining input information during interactive processing by said model interactive synthesizing means; know-how registration means for registering the relationship between a shape feature, which is know-how for constructing an analysis model, and an analysis model; know-how forming means for forming know-how registered in said know-how registration means, said know-how being effective for synthesization models; know-how being editing means for merging know-how already registered in said know-how registration means and know-how formed by said know-how forming means while avoiding occurrence of contradiction between the know-how; and model synthesizing means for synthesizing flow analysis models for analyzing the entire flowpassage, wherein even with respect to an object in which flow analysis models cannot be synthesized in terms of relationship between the already registered shape feature and the analysis model in said model synthesizing means, the flow analysis models can be synthesized by once subjecting them to interactive processing.

11. In a system for calculating a flow state material to evaluate a flowpassage shape, a flow control condition, and material, a flow analysis system comprising: experimental data registration means for registering experimental data relating to a material characteristic; characteristic formula defining means for defining a characteristic formula representative of said material characteristic; difference appraisal formula defining means for defining an appraisal formula to numerically evaluate a difference between experimental data register by said experimental data registration means and a value produced by the characteristic formula defined by said characteristic formula defining means; difference appraisal means for computing the difference between the experimental data and the value produced by the characteristic formula using said appraisal formula; and parameter correction amount computation means operating on the basis of a characteristic formula for computing the correction amount of parameters, peculiar to the material determined from the experimental data, from the difference computed by said difference appraisal means, wherein the flow analysis with respect to material whose characteristic changes with hysteresis is carried out.

12. The system according to claim 11, wherein said system is used to evaluate a viscosity of resin having a thermoset characteristic in a flow state within the mold and design material for determining components of the resin.

* * * * *